(12) United States Patent
Abe et al.

(10) Patent No.: US 7,403,889 B2
(45) Date of Patent: Jul. 22, 2008

(54) ELECTRONIC DICTIONARY WITH EXAMPLE SENTENCES

(75) Inventors: Takatoshi Abe, Hamura (JP); Yuichi Kobayashi, Higashiyamato (JP)

(73) Assignee: Casio Computer Co., Ltd., Tokyo (JP)

( * ) Notice: Subject to any disclaimer, the term of this patent is extended or adjusted under 35 U.S.C. 154(b) by 412 days.

(21) Appl. No.: 11/144,950

(22) Filed: Jun. 3, 2005

(65) Prior Publication Data

US 2005/0228639 A1    Oct. 13, 2005

Related U.S. Application Data

(63) Continuation of application No. PCT/JP03/16124, filed on Dec. 16, 2003.

(30) Foreign Application Priority Data

Dec. 26, 2002  (JP) .............................. 2002-376631
Dec. 27, 2002  (JP) .............................. 2002-382427

(51) Int. Cl.
*G06F 17/28*   (2006.01)
*G06F 17/21*   (2006.01)
*G06F 17/30*   (2006.01)

(52) U.S. Cl. ..................... 704/7; 704/2; 704/10; 707/3; 707/100

(58) Field of Classification Search ........................ None
See application file for complete search history.

(56) References Cited

U.S. PATENT DOCUMENTS

| | | | | |
|---|---|---|---|---|
| 4,942,526 | A * | 7/1990 | Okajima et al. | 704/10 |
| 5,787,386 | A * | 7/1998 | Kaplan et al. | 704/8 |
| 5,870,702 | A * | 2/1999 | Yamabana | 704/10 |
| 5,885,081 | A * | 3/1999 | Tamura et al. | 434/169 |
| 6,154,737 | A * | 11/2000 | Inaba et al. | 707/3 |
| 6,321,189 | B1 * | 11/2001 | Masuichi et al. | 704/7 |
| 6,397,174 | B1 * | 5/2002 | Poznanski et al. | 704/9 |
| 6,735,559 | B1 * | 5/2004 | Takazawa | 704/7 |
| 7,072,826 | B1 * | 7/2006 | Wakita | 704/2 |
| 7,107,204 | B1 * | 9/2006 | Liu et al. | 704/2 |

(Continued)

FOREIGN PATENT DOCUMENTS

GB   2 364 146 A   1/2002

(Continued)

*Primary Examiner*—David Hudspeth
*Assistant Examiner*—Matthew J. Sked
(74) *Attorney, Agent, or Firm*—Frishauf, Holtz, Goodman & Chick, P.C.

(57) ABSTRACT

An information display control apparatus capable of searching for an example sentence suitable for words input as a search phrase and displaying the example sentence. The information display control apparatus has: an example sentence storage means for storing an example sentence and an entry word thereof; an example sentence and word storage means for storing a word and the example including the word; an input means for inputting a plurality of words; an extraction means for extracting the example sentence including the plurality of words among the example sentence stored in the example sentence and word storage means; and a display control means for performing control of extracting the example sentence stored with the entry word which corresponds to any word or an altered form of any word among the plurality of words among the example sentence extracted by the extraction means, and displaying the extracted example sentence.

11 Claims, 33 Drawing Sheets

U.S. PATENT DOCUMENTS 7,130,801 B2 * 10/2006 Kitahara et al. ............ 704/277

FOREIGN PATENT DOCUMENTS

| | | | |
|---|---|---|---|
| JP | 57-027367 A | 2/1982 |
| JP | 03-065762 A | 3/1991 |
| JP | 04-267476 A | 9/1992 |
| JP | 6-318232 A | 11/1994 |
| JP | 7-114565 A | 5/1995 |
| JP | 07-141381 A | 6/1995 |
| JP | 10-105555 A | 4/1998 |
| JP | 11-161650 A | 6/1999 |
| JP | 2000-112953 A | 4/2000 |
| JP | 2000-194701 A | 7/2000 |
| JP | 2001-092850 A | 4/2001 |
| JP | 2001-134567 A | 5/2001 |
| JP | 2001-134568 A | 5/2001 |
| JP | 2002-328948 A | 11/2002 |
| JP | 2002-358301 A | 12/2002 |

* cited by examiner

222a: get

222b: 意味
[他動]
1a 〈人が〉〈物・事〉を得る、手に入れる…
 b 〈人が〉～に～を手に入れてやる…

222c: ………
………

用例 , …, 172, …, 198, …

222

228

| ORIGINAL WORD | ALTERED FORMS |
|---|---|
| ⋮ | ⋮ |
| get | get,gets,got,getting,gotten |
| got | get,gets,got,getting,gotten |
| ⋮ | ⋮ |

230

| WORD | LEVEL |
|---|---|
| ⋮ | ⋮ |
| like | A |
| ⋮ | ⋮ |

FIG.4A

| EXAMPLE SENTENCE NUMBER | EXAMPLE SENTENCE | REFERENCE ENTRY WORD | EXAMPLE SENTENCE DIFFICULTY | COLLOCATION IMPORTANCE |
|---|---|---|---|---|
| ⋮ | ⋮ | ⋮ | ⋮ | ⋮ |
| 024 | The water was so calm (that) it looked like glass.<br>水面はとても穏やかで鏡のように見えた. | calm | B | A so that B look like |
| ⋮ | ⋮ | ⋮ | ⋮ | ⋮ |
| 126 | It looks[sounds]like the exhaust pipe needs repairing.<br>排気管は修理が必要なようだ. | like | A | A look like |
| ⋮ | ⋮ | ⋮ | ⋮ | ⋮ |
| 153 | What does your garden look like?<br>お宅の庭はどんな形をしていますか. | look | A | A look like |
| ⋮ | ⋮ | ⋮ | ⋮ | ⋮ |
| 156 | He looks like winning <the> first prize.<br>(将来)彼は1等賞をとりそうだ. | look | B | A look like |
| ⋮ | ⋮ | ⋮ | ⋮ | ⋮ |
| 315 | Would you like to look at the menu?<br>メニューをごらんになりますか. | menu | A | — |
| ⋮ | ⋮ | ⋮ | ⋮ | ⋮ |

| EXAMPLE SENTENCE WORD | EXAMPLE SENTENCE NUMBER |
|---|---|
| ⋮ | ⋮ |
| like | ⋯,24,⋯,48,⋯,126,⋯,153,⋯156,⋯,214,⋯,315,⋯ |
| ⋮ | ⋮ |
| look | ⋯,6,⋯,24,⋯,56,⋯,126,⋯,153,⋯156,⋯,182,⋯,315,⋯ |
| ⋮ | ⋮ |

226

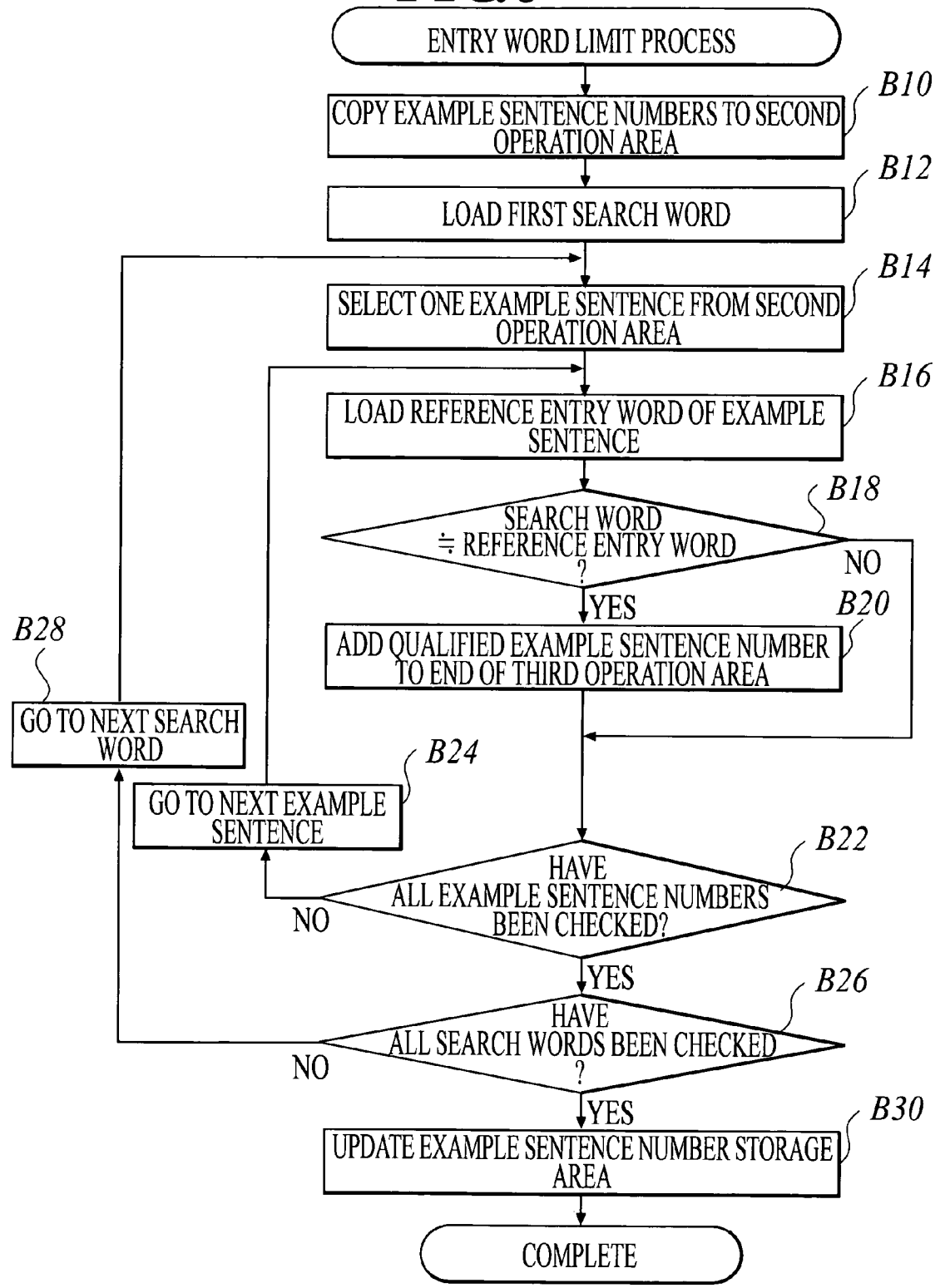

FIG. 7A
| SEARCH WORD | EXAMPLE SENTENCE NUMBER |
|---|---|
| like | ···,24,···,48,···,126,···,153,···156,···,214,···,315,··· |
| look | ···,6,···,24,···,56,···,126,···,153,···156,···,182,···,315,··· |
306
FIG. 7B
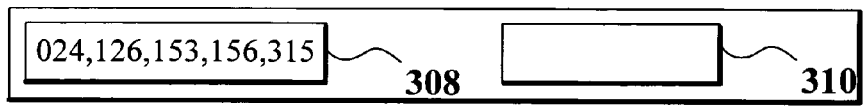
024,126,153,156,315,···  304
FIG. 7C(i)
024,126,153,156,315   308      310
FIG. 7C(ii)
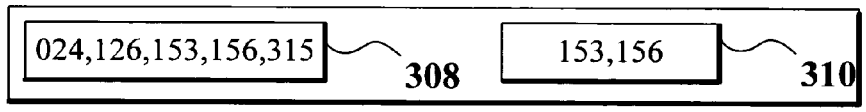
024,126,153,156,315   308   153,156   310
FIG. 7C(iii)
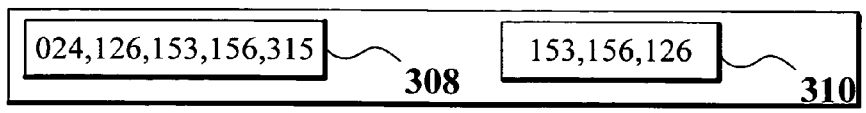
024,126,153,156,315   308   153,156,126   310

FIG.9A

| No | EXAMPLE SENTENCE | REFERENCE ENTRY WORD |
|---|---|---|
| ⋮ | ⋮ | ⋮ |
| 036 | It's about time you got up.<br>もう起きてもいいころだよ. | about |
| ⋮ | ⋮ | ⋮ |
| 128 | develop the habit of getting up early in the morning.<br>早起きの習慣がつく | develop |
| ⋮ | ⋮ | ⋮ |
| 172 | She got up to protest.<br>彼女は抗議のために立ち上がった. | get |
| ⋮ | ⋮ | ⋮ |
| 198 | get the piano up to the room<br>ピアノを部屋へ運び上げる | get |
| ⋮ | ⋮ | ⋮ |
| 210 | He got up from his chair.<br>彼はいすから立ち上がった | up |
| ⋮ | ⋮ | ⋮ |

| WORD | EXAMPLE SENTENCE NUMBER |
|---|---|
| ⋮ | ⋮ |
| get | ⋯,18,⋯,36,⋯,105,⋯,128,⋯,172,⋯,198,⋯,210,⋯ |
| ⋮ | ⋮ |
| got | ⋯,36,⋯,172,⋯,210,⋯ |
| ⋮ | ⋮ |
| up | ⋯,36,⋯,64,⋯,128,⋯,172,⋯,198,⋯,210,⋯ |
| ⋮ | ⋮ |

226

FIG.10A
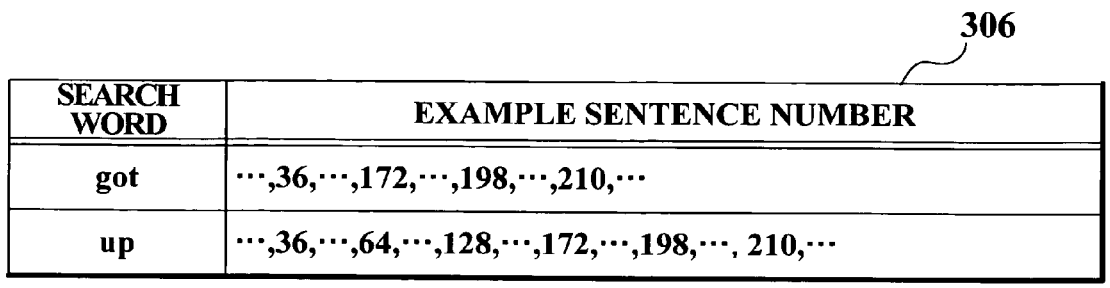
| SEARCH WORD | EXAMPLE SENTENCE NUMBER |
|---|---|
| got | ⋯,36,⋯,172,⋯,198,⋯,210,⋯ |
| up | ⋯,36,⋯,64,⋯,128,⋯,172,⋯,198,⋯, 210,⋯ |
FIG.10B
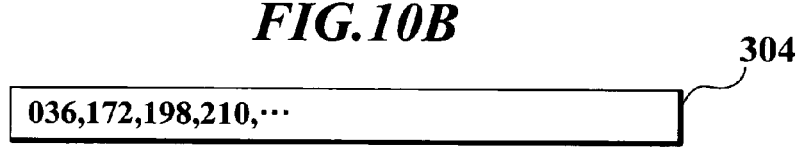
FIG.10C(i)
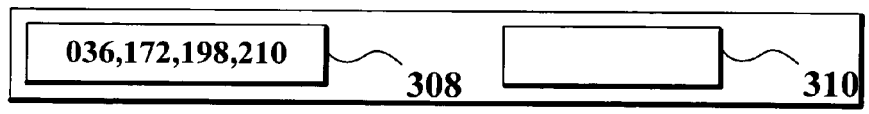
FIG.10C(ii)
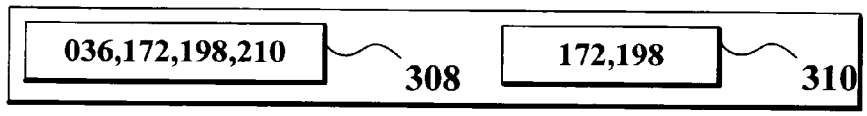
FIG.10C(iii)
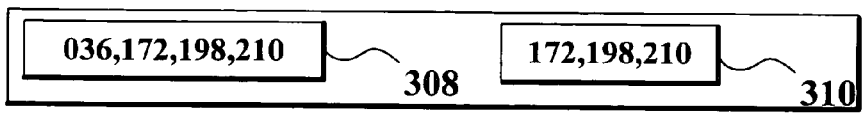

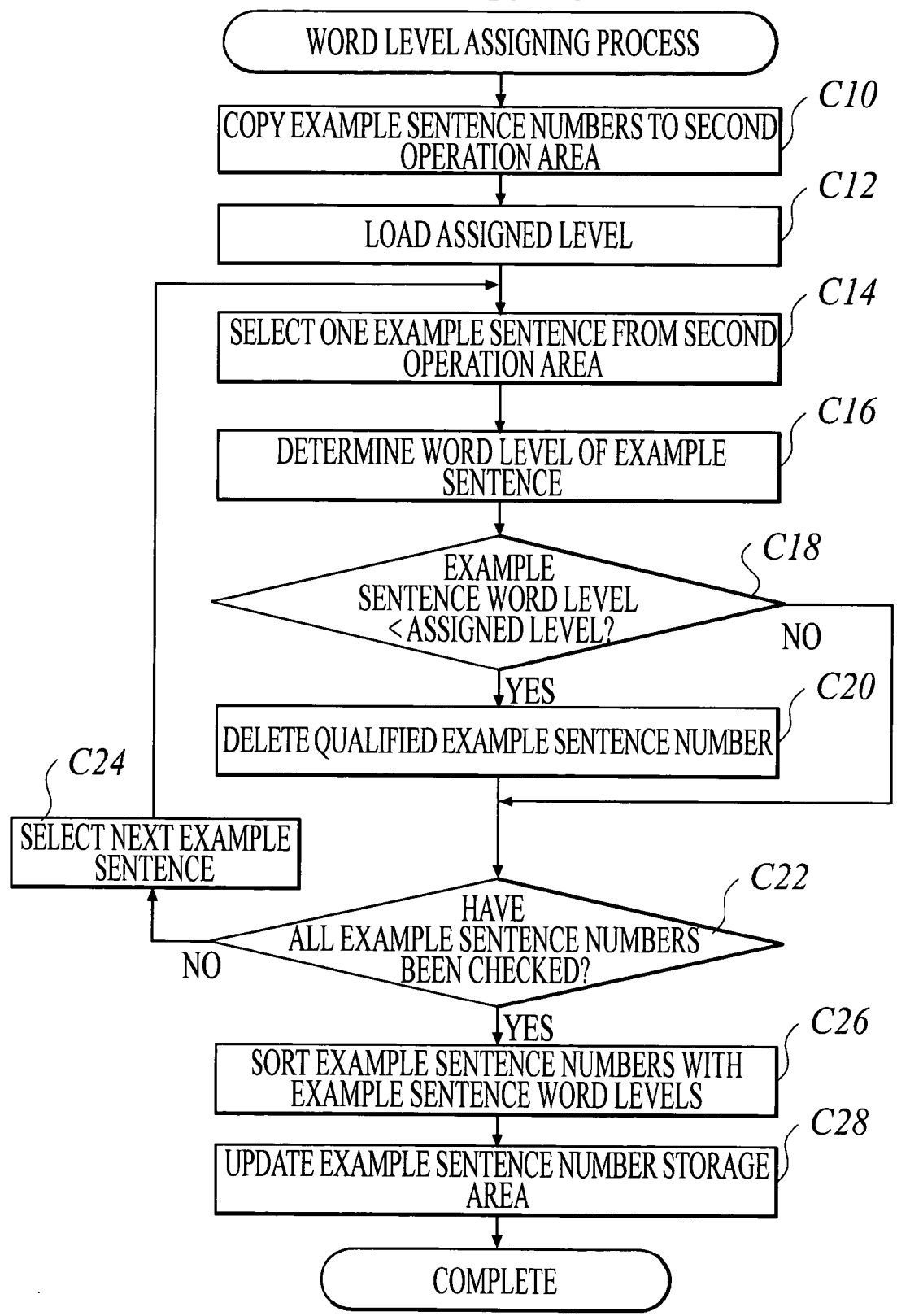

No.24
The water was so <u>calm</u> (that) it looked like glass.
A   A     A   A B     A   AA     A   A
→EXAMPLE SENTENCE WORD LEVEL B No.153
What does your garden look like?
A   A     A       A     A   A   →EXAMPLE SENTENCE WORD LEVEL A

FIG.13C

ENGLISH-JAPANESE DICTIONARY
[EXAMPLE SENTENCE SEARCH]

【look】
What does your garden <u>look like</u>?  ～T1
　お宅の庭はどんな形をしていますか.
【look】　　　／T1
He <u>looks like</u>/winning ⟨the⟩ first prize.
　(将来)彼は1等賞をとりそうだ.
【menu】　　　／T1　　　／T1
Would you <u>like</u>/to <u>look</u>/at the menu?
　メニューをごらんになりますか.
【calm】
The water was so calm (that) it <u>looked like</u> glass.
　水面はとても穏やかで鏡のように見えた. ～T1
【like】　／T1　　　　／T1
It <u>looks</u>/[sounds] <u>like</u>/the exhaust pipe needs repairing.
　排気管は修理が必要なようだ.

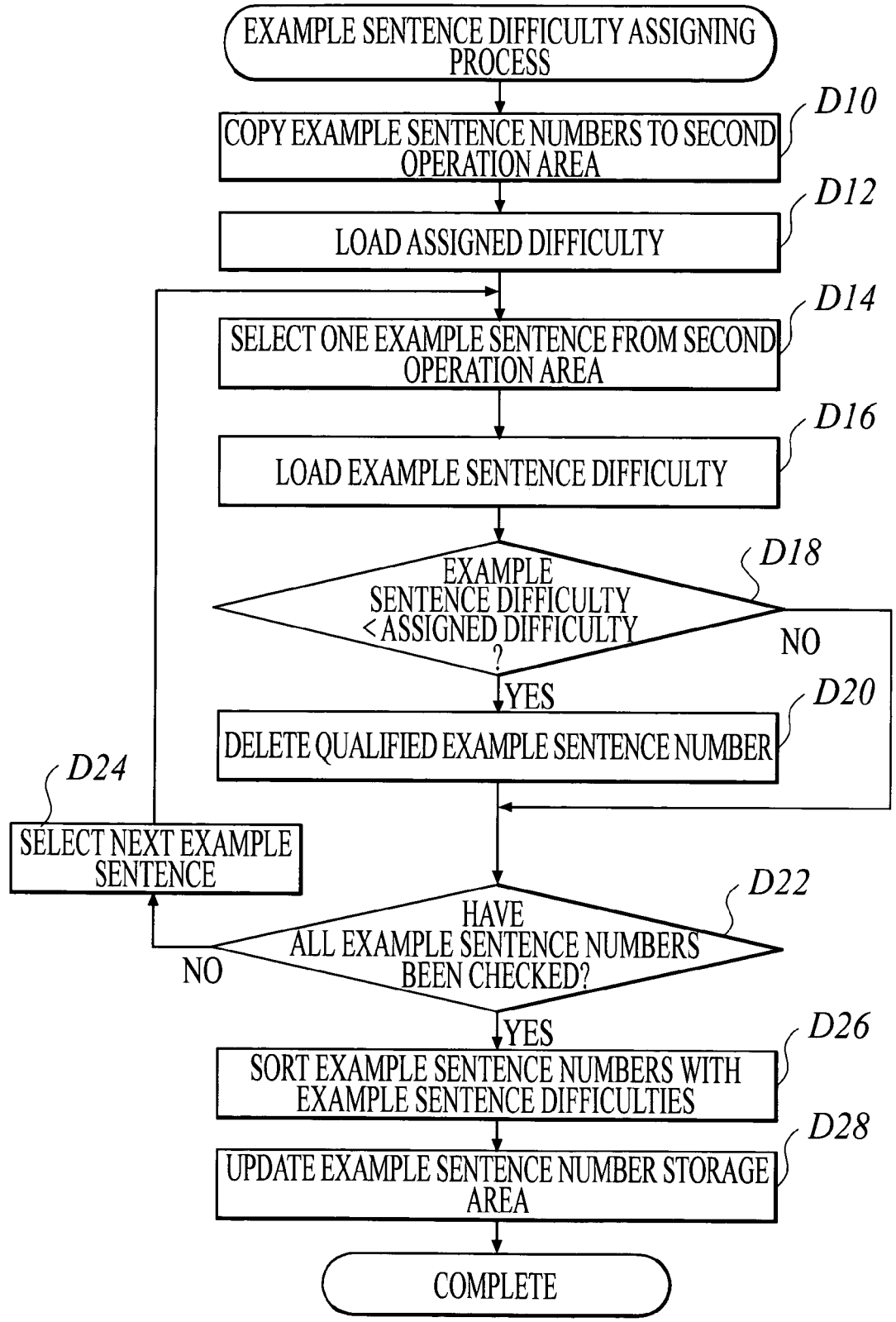

ENGLISH-JAPANESE DICTIONARY
[EXAMPLE SENTENCE SEARCH]

【like】
It <u>looks</u>)T1 [sounds] <u>like</u>)T1 the exhaust pipe needs repairing.
　排気管は修理が必要なようだ.
【look】
What does your garden <u>look like</u>? ～T1
　お宅の庭はどんな形をしていますか.
【menu】
Would you <u>like</u>)T1 to <u>look</u>)T1 at the menu?
　メニューをごらんになりますか.
【calm】
The water was so calm (that) it <u>looked like</u> glass.
　水面はとても穏やかで鏡のように見えた. ＼T1
【look】
He <u>looks like</u>)T1 winning ⟨the⟩ first prize.
　(将来)彼は1等賞をとりそうだ.

ENGLISH-JAPANESE DICTIONARY [EXAMPLE SENTENCE SEARCH]

【like】
It <u>looks</u>)ᵀ¹ [sounds] <u>like</u>)ᵀ¹ the exhaust pipe needs repairing.
　排気管は修理が必要なようだ.
【look】
What does your garden <u>look like</u>? ～ᵀ¹
　お宅の庭はどんな形をしていますか.
【look】　　ᵀ¹
He <u>looks like</u>)winning ⟨the⟩ first prize.
　(将来)彼は1等賞をとりそうだ.
【calm】
The water was so calm (that) it <u>looked like</u> glass.
　水面はとても穏やかで鏡のように見えた.　ᵀ¹
【menu】　　　ᵀ¹　　ᵀ¹
Would you <u>like</u>)to <u>look</u>)at the menu?　ᵀ¹
　メニューをごらんになりますか.

FIG.21

| ENTRY WORD | EXPLANATION DATA | EXAMPLE SENTENCE IDENTIFICATION INFORMATION | |
|---|---|---|---|
| | | EXAMPLE SENTENCE NUMBER | ADDRESS |
| ……… | ……… | ……… | ……… |
| accordingly | 副）それに応じて、状況に応じて、… | 00197、… | 00C5BLOCK、… |
| aberration | 名）逸脱、脱線、欠陥、奇行、… | 00320、… | 0140BLOCK、… |
| adult | 名）おとな、成人、… | 00197、… | 00C5BLOCK、… |
| English | 形）イングランドの、イングランド人の、… | 00566、… | 0236BLOCK、… |
| for | 前）〜に向かって、〜行きの、… | 00566、… | 0236BLOCK、… |
| in | 前）〜の中に、〜のなかで、… | 00689、… | 03DBBLOCK、… |
| keep | 動）持ち続ける、置いておく、… | 00689、… | 03DBBLOCK、… |
| leaf | 名）葉、… | 01058、… | 0422BLOCK、… |
| solar | 形）太陽の、太陽に関する、… | 01058、… | 0422BLOCK、… |
| sunlight | 名）日光、陽光、… | 00812、… | 040FBLOCK、… |
| yourself | 代）あなた自身で、… | | |
| ……… | ……… | ……… | ……… |

| EXAMPLE SENTENCE IDENTIFICATION INFORMATION | | EXAMPLE SENTENCE |
|---|---|---|
| EXAMPLE SENTENCE NUMBER | ADDRESS | |
| ⋮ | ⋮ | ⋮ |
| 00197 | 00C5 BLOCK | She is an adult, so you should treat her accordingly.<br>(彼女は大人だから、それ相応に扱うべきだ) |
| 00320 | 0140 BLOCK | in ( a moment of ) aberration<br>(魔がさして) |
| 00566 | 0236 BLOCK | get an A in [ for ] English |
| 00689 | 03DB BLOCK | keep leaves<br>(落ち葉にして保存する) |
| 00812 | 040F BLOCK | Look into it for yourself.<br>(あなた自身で調べなさい) |
| 00935 | 0419 BLOCK | She kept the apple for herself.<br>(彼女は自分でりんごを持っている) |
| 01058 | 0422 BLOCK | the solar access = the access to sunlight<br>(日光) |
| ⋮ | ⋮ | ⋮ |

FIG.23

| WORD | EXAMPLE SENTENCE NUMBER |
|---|---|
| ⋮ | ⋮ |
| adult | 00197、··· |
| accordingly | 00197、··· |
| aberration | 00320、··· |
| motion | 00197、··· |
| get | 00566、··· |
| in | 00320、00566、··· |
| for | 00566、00812、00935、··· |
| English | 00566、··· |
| of | 00320、··· |
| ⋮ | ⋮ |

2663

ELECTRONIC DICTIONARY WITH EXAMPLE SENTENCES

CROSS REFERENCE TO RELATED APPLICATION

This is a continuation of International Application No. PCT/JP03/16124, filed on Dec. 16, 2003.

BACKGROUND OF THE INVENTION

1. Field of the Invention

The present invention relates to an information display control apparatus and a program for performing control to display an example sentence using an entry word conforming to an input word.

2. Description of Related Art

An information display control apparatus called as an electronic dictionary has been conventionally known. Such an electronic dictionary therein incorporates several kinds of electronic dictionary data such as the data of a Japanese dictionary, the data of an English-Japanese dictionary, the data of a Japanese-English dictionary, the data of an English dictionary, the data of an encyclopedia, and the like. As one of the functions equipped by the electronic dictionary, an example sentence search function is known.

For example, an entry word "look" is stored in an English-Japanese dictionary database (hereinafter a database is referred to as "DB") correspondingly to explanation information thereof being a semantic content thereof. In the explanation information, an example sentence using the entry word "look" is included. The example sentence search function is a function for searching for an example sentence using a desired word among example sentences included in such dictionary DBs to display the searched example sentence. As a technique for accelerating the example sentence search, for example, a technique disclosed in Japanese Patent Application Publication (Laid-Open) No. 2001-134567 is known.

However, the conventional example sentence search function has a following intrinsic problem even if the conventional example sentence search function is accelerated by use of the technique disclosed in the Japanese Patent Application Publication (Laid-Open) No. 2001-134567. That is, for example, when a user performs the example sentence search by use of the words "look" and "up" as search words, example sentences including the words "look" and "up" are simply searched for to be displayed. Consequently, an example sentence having no direct relation to the words "look" and "up" such as "She came up for a look at the new boy." or the like is displayed.

When the number of the example sentences displayed on a screen by means of the example sentence search function is two or three, trouble of a user for finding a desired example sentence is small. However, when tens of example sentences which cannot be displayed in one screen are displayed, the user may get irritated. In particular, the so-called full content type electronic dictionary, which is made by digitalizing the whole contents of a paper-made dictionary, has been frequently used recently. In such an electronic dictionary, amount of explanation information for one entry V word is large, and proportionally, a large number of example sentences are stored. Consequently, there are lots of cases where the number of the example sentences which are searched for to be displayed by the example sentence search function approaches tens. In such cases, the user needs to scroll the contents while confirming the contents of the example sentences.

SUMMARY OF THE INVENTION

An object of the present invention is to make an information display control apparatus such as an electronic dictionary or the like search for an example sentence conforming to a word input as a search word to be displayed in the example sentence search on the information display control apparatus.

The present invention has been made to solve the problems or the inconveniences set forth above, and in accordance with a first aspect of the present invention, an information display control apparatus comprises: an example sentence storage means for correspondingly storing an example sentence and an entry word of the example sentence; an example sentence and word storage means for correspondingly storing a word and the example sentence stored in the example sentence storage means, the example sentence including the word; an input means for inputting a plurality of words; an extraction means for extracting the example sentence including the plurality of words input by the input means among the example sentence correspondingly stored in the example sentence and word storage means with the word; and a display control means for performing control of extracting the example sentence correspondingly stored in the example storage means with the entry word which corresponds to any word among the plurality of words or an altered form of any word among the plurality of words input by the input means among the example sentence extracted by the extraction means, and displaying the extracted example sentence.

Accordingly, the example sentence stored in the example sentence storage means and related to the entry word corresponding to any word among the input plurality of words or an altered form of any word among the input plurality of words can be suitably displayed.

In accordance with a second aspect of the present invention, an information display control apparatus comprises: an example sentence storage means for correspondingly storing an example sentence and an entry word of the example sentence; a collocation storage means for correspondingly storing a collocation included in each example sentence stored in the example sentence storage means and a level of the collocation; an input means for inputting a plurality of words; an extraction means for extracting the example sentence including the plurality of words input by the input means among the example sentence stored in the example sentence storage means; and a collocation level display control means for loading the collocation included in each example sentence extracted by the extraction means, the collocation including the plurality of words input by the input means among the collocation stored in the collocation storage means, and for performing control of displaying each example sentence on the basis of the level of the loaded collocation.

Accordingly, it is possible not to display the example sentence having the input plurality of words not satisfying collocation relationship, but to suitably display the example sentence having the input plurality of words as a collocation on the basis of the level of the collocation.

In accordance with a third aspect of the present invention, an information display control apparatus comprises: an example sentence storage means for storing a plurality of example sentences in accordance with a predetermined dictionary statement rule; a search phrase input means for inputting a search phrase composed of a plurality of words; an example sentence extraction means for extracting the example sentence including all the plurality of words composing the search phrase input by the search phrase input means among the example sentences stored in the example sentence storage means; a development means for developing each example sentence extracted by the example sentence extraction means into a plurality of sentences in accordance with the predetermined dictionary statement rule; a search means for searching for the example sentence including all the plurality of words input by the search phrase input means corresponding to any one of the plurality of sentences developed by the development means among the extracted example sentence; and an example sentence display means for displaying the example sentence searched for by the search means.

Accordingly, it is possible to search for the example sentence including all the plurality of words suitably in accordance with the predetermined dictionary statement rule, and to display the searched example sentence.

Preferably, in the information display control apparatus of the third aspect of the present invention, the search phrase input means comprises: a separation input means for inputting the plurality of words with a predetermined letter so as to separate the plurality of words; and an input order extraction means for extracting the example sentence including all the input plurality of words continuously in input order thereof corresponding to any one of the plurality of sentences developed by the development means among the example sentence searched for by the search means, when the plurality of words are input with the predetermined letter separating the plurality of words.

For example, even when various letters or marks are added to the example sentence in accordance with the dictionary statement rule, it is possible to develop the example sentence into a plurality of sentences according to the letter or the marks, and then to suitably extract the example sentence including the input plurality of words in the input order thereof.

BRIEF DESCRIPTION OF THE DRAWINGS

The present invention will become more fully understood from the detailed description given hereinbelow and the appended drawings, and thus are not intended as a definition of the limits of the present invention, and wherein:

FIGS. 4A and 4B are diagrams showing data structure examples of an example sentence table (FIG. 4A) and a word and example sentence table (FIG. 4B);

FIG. 6 is a diagram showing an operation flow of an entry word limit process;

FIGS. 7A, 7B, 7C(i), 7C(ii) and 7C(iii) are diagrams showing examples of operation areas in the entry word limit process;

FIGS. 9A and 9B are diagrams showing data structure examples of an entry word table (FIG. 9A) and a word and example sentence table;

FIGS. 10A, 10B, 10C(i), 10C(ii) and 10C(iii) are diagrams showing examples of operation areas in the entry word limit process;

FIG. 12 is a diagram showing an operation flow of a word level assigning process;

FIGS. 13A(i) and 13A(ii) are views showing examples of operation areas in the word level assigning process;

FIG. 13B is a view for illustrating steps for determining example sentence word levels;

FIG. 13C is a view showing a display example when the word level assigning process is executed;

FIG. 14 is a diagram showing an operation flow of an example sentence difficulty assigning process;

FIGS. 15A(i) and 15A(ii) are views showing examples of an operation area in the example sentence difficulty assigning process;

FIGS. 15B is a view showing a display example when the example sentence difficulty assigning process is executed;

FIGS. 17A(i) and 17A(ii) are views showing other examples of the operation area in the collocation importance assigning process;

FIG. 17B is a view showing a display example when the collocation importance assigning process is executed;

FIG. 21 is a diagram showing a data structure example of an entry word data table;

FIG. 22 is a diagram showing a data structure example of an example sentence data table;

FIG. 23 is a diagram showing a data structure example of a word and example sentence data table;

PREFERRED EMBODIMENT OF THE PRESENT INVENTION

First Embodiment

In the following, with reference to FIGS. 1 to 18B, an embodiment where the present invention is applied to an electronic dictionary being one type of information display control apparatus will be described in detail. However, what the present invention can be applied to is not limited to the description.

The electronic dictionary therein incorporates various electronic dictionary data (dictionary databases) such as data of a Japanese dictionary, an English-Japanese dictionary, a Japanese-English dictionary, of a proverb dictionary and the like. In the dictionary database (hereinafter, the database is referred to as "DB"), explanation information such as letter data, image data, dynamic image data, voice data and the like for explaining an entry word is stored as related to the entry word. A user can make a commentary of a word and the like displayed by selecting a type of dictionaries and inputting the word. Incidentally, in the following, the case where the dictionary DB of an English-Japanese dictionary is incorporated in the electronic dictionary will be described as an example.

Figure 1:
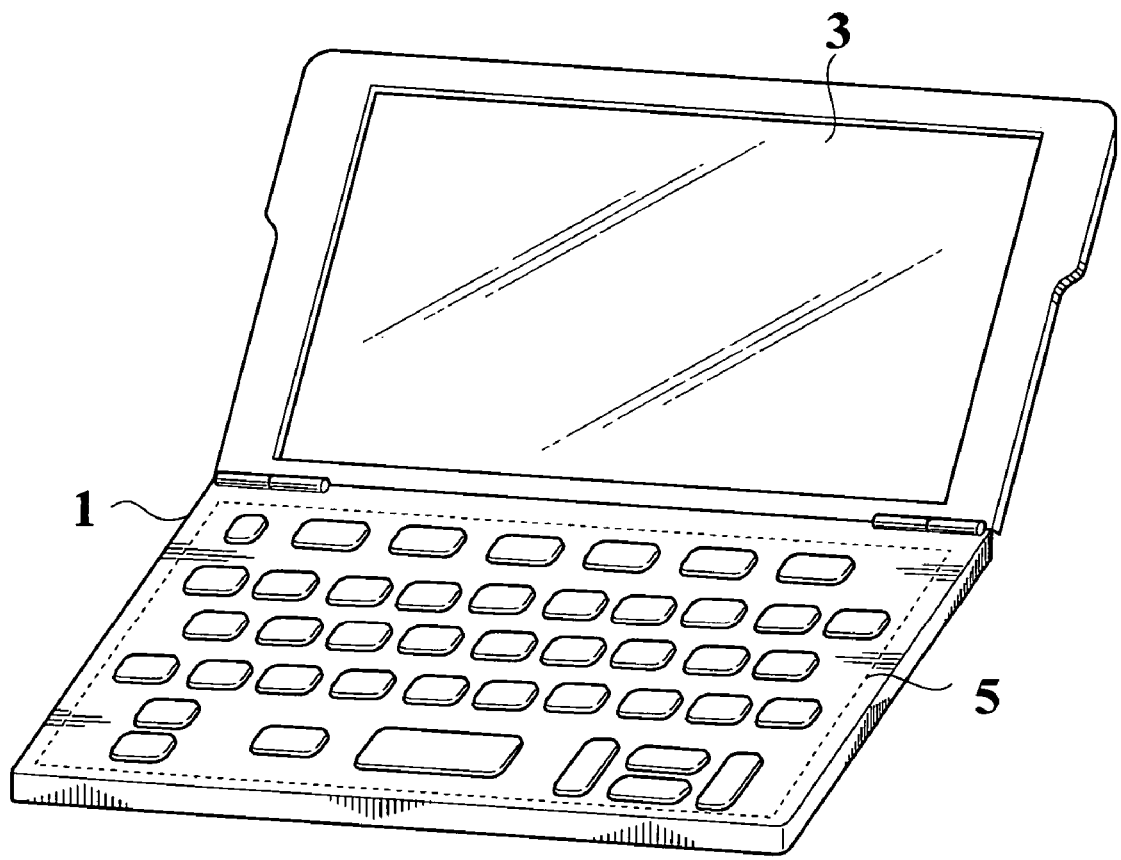
FIG. 1 is a view showing an electronic dictionary of the present embodiment.

FIG. 1 shows a schematic view of an electronic dictionary 1. As shown in FIG. 1, the electronic dictionary 1 comprises a display 3 and a various key group 5. Hereupon, peculiar functions are severally assigned to the keys constituting the various key group 5. The user operates the electronic dictionary 1 by pushing down these keys. To put it concretely, the various key group 5 is provided with letter input keys, a selection key to select a type of dictionaries, a jump key to jump to an assigned word, an example display key to display an example of an assigned word, and the like. By pushing down these keys, the user can make the electronic dictionary 1 execute the functions assigned to the keys. For example, when an English-Japanese dictionary button is pushed down, the electronic dictionary 1 is switched to an English-Japanese dictionary mode, and search execution in the English-Japanese dictionary DB can be performed.

Figure 2:
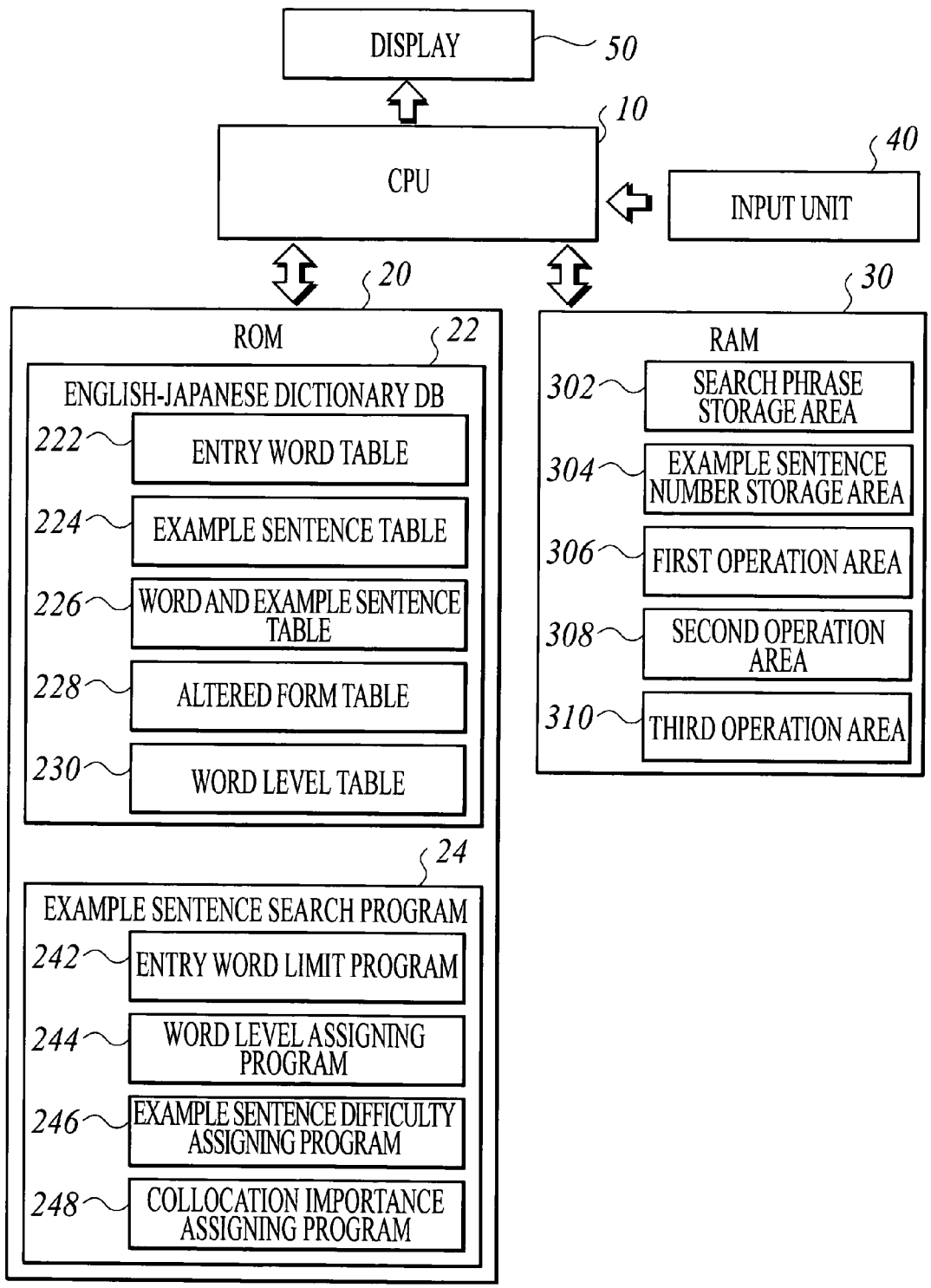
FIG. 2 is a diagram showing a structure example of the electronic dictionary of the present embodiment.

FIG. 2 is a block diagram showing a structure of the electronic dictionary 1. As shown in FIG. 2, the electronic dictionary 1 comprises several units, such as a central processing unit (CPU) 10, a loaded only memory (ROM) 20, a random access memory (RAM) 30, an input unit 40 and a display 50.

The CPU 10 executes a process based on a predetermined program according to an input instruction, makes an instruction to each function unit and transmits data. To put it concretely, the CPU 10 loads a program stored in the ROM 20 according to an operation signal input at the input unit 40, and executes a process in accordance with the loaded program. Then, the CPU 10 outputs a display signal for displaying a result of the process to the display 50 suitably and makes the display 50 display corresponding display information.

The CPU 10 executes an example sentence search process in accordance with an example sentence search program 24 stored in the ROM 20, which will be described later. The detail of the example sentence search process will be described later, but the outline thereof is as follows. First, the CPU 10 makes the display 50 display an input screen for inputting a search word and a condition for filtering an example sentence. Then, when a user inputs the search word composed of a plurality of words and the condition for filtering an example sentence, the CPU 10 searches in an English-Japanese dictionary DB 22 for an example sentence including the search word, and makes the display 50 display the example sentence in accordance with the input conditions.

The ROM 20 stores initial programs for performing various kinds of initialization, examinations of hardware, loading of necessary programs and the like. The CPU 10 executes the initial programs at the time of turning on the electric power of the electronic dictionary 1, and thereby the CPU 10 sets an operation environment of the electronic dictionary 1.

Moreover, the ROM 20 stores various process programs in regard to operations of the electronic dictionary 1 such as a menu display process, various setting processes, various search processes and the like, and programs for realizing various functions of the electronic dictionary 1. In addition, the ROM 20 stores the English-Japanese dictionary DB 22. Moreover, the ROM 20 stores the example sentence search program 24 as a program.

The English-Japanese dictionary DB 22 comprises an entry word table 222, an example sentence table 224, a word and example sentence table 226, an altered form table 228 and a word level table 230. Moreover, the example sentence search program 24 comprises an entry word limit program 242, a word level assigning program 244, an example sentence difficulty assigning program 246 and a collocation importance assigning program 248.

Figures 3A, 3B, 3C:
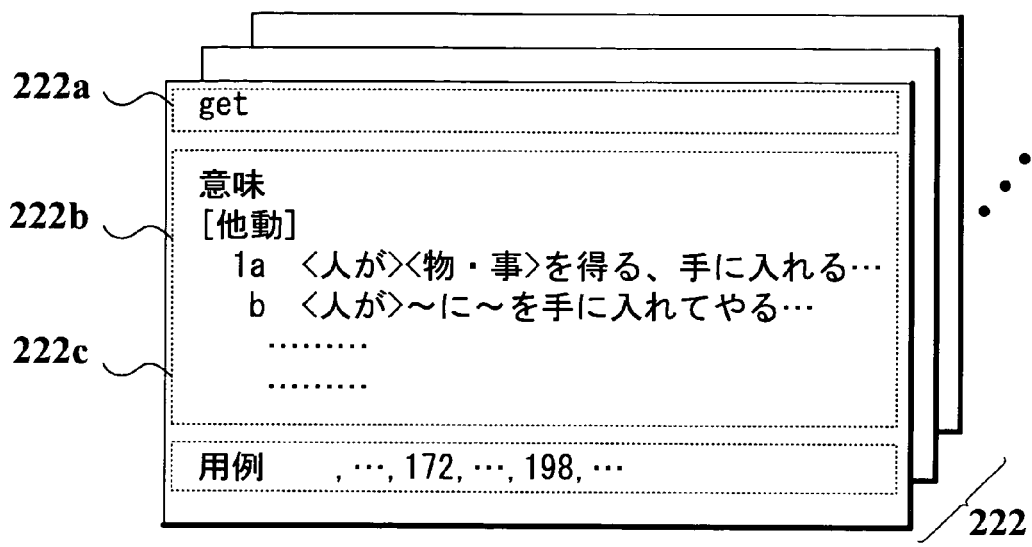
FIGS. 3A, 3B and 3C are diagrams showing data structure examples of an entry word table (FIG. 3A), an altered form table (FIG. 3B), and a word level table (FIG. 3C)

FIG. 3A is a diagram showing a data structure example of the entry word table 222. The entry word table 222 stores an entry word 222a (for example "get"), explanation information 222b showing the meaning of the entry word (for example, "[他動] 1a <人が><物·事>を得る, 手に入れ...", and an example sentence number 222c, which is identification information for identifying an example sentence included in the explanation information as related to each entry word.

The entry word table 222 is a data table in which the basic data of the English-Japanese dictionary DB 22 is stored. When a search word is input in the English-Japanese dictionary mode, an entry word conforming to the search word is loaded, and the loaded entry word is displayed along with the explanation information corresponding to the entry word. For example, in FIG. 3A, explanation information "[他動] 1a <人が><物·事>を得る, 手に入れ..." of the entry word "get" is displayed on the display 50. Moreover, when an example sentence corresponding to the displayed entry word exists, the CPU 10 loads the example sentence to be displayed according to a predetermined operation. In FIG. 3A, the example sentences having example sentence numbers "172" and "198" are loaded to be displayed.

FIG. 4A is a diagram showing a data structure example of the example sentence table 224. The example sentence table 224 stores example sentence numbers, example sentences corresponding to the example sentence numbers, reference entry words, example sentence difficulty and collocation importance as related to each other. Moreover, the meanings of the example sentences are also stored.

The reference entry words indicate that the example sentences severally correspond to which entry word in the entry word table 222. For example, the example sentence "It looks [sounds] like the ..." of an example sentence number "126" is stored as related to an entry word "like" in the entry word table 222.

The example sentence difficulty is information indicating a difficulty of the example sentences. The easiest level example sentence is defined as "A", and the second easiest level example sentence is defined as "B". The rest is similarly defined in an alphabetical order. Moreover, when the level "A" is compared with the level "B", the level "A" is treated as larger than the level "B". The rest is similarly treated to be getting smaller as the level proceeds toward the end of the alphabet as "B", "C", "D", . . . . For example, when an example sentence having an example sentence number "153" is compared with an example sentence having an example sentence number "156", an example sentence difficulty of the example sentence number "153" is "A", and an example sentence difficulty of the example sentence number "156" is "B". Consequently, in view of the magnitude relation between them, the difficulty of the example sentence number "153" is larger than that of the example sentence number "156". However, needless to say, the electronic dictionary 1 may be structured on the basis of a reverse magnitude relation.

The collocation importance indicates importance levels of collocations included in the example sentences. Collocations are stored in the order of the collocation importance in each of the example sentences. In particular, in the case of the example sentences having no collocations, no collocation importance value is stored. For example, in the example sentence number "024", the example sentence includes two collocations of "so that" and "look like". Since "look like", is stored at second, collocation importance of "look like" is "B". On the other hand, in the example sentence number "126", because the collocation "look like" is stored at first, collocation importance of the "look like" is "A". Moreover, when the level "A" and the level "B" are compared, the level "A" is regarded as larger. Thereafter, as the level proceeds as "B", "C", "D", . . . , the level becomes smaller in the alphabetical order of "B", "C", "D", . . . toward the end. However, of course, the electronic dictionary 1 may be structured on the basis of the order in a reverse magnitude relation.

FIG. 4B is a diagram showing a data structure example of the word and example sentence table 226. The word and example sentence table 226 stores words and the example sentence numbers of the example sentences including the words as related to each other.

FIG. 3B is a diagram showing a data structure example of the altered form table 228. The altered form table 228 stores altered forms of each original word. Here, the original word may be a word in its original form, or a word in an altered form such as a past tense or the like. Moreover, the altered form is different according to a part of speech of an original word such as a verb, an adjective, a pronoun or the like. For example, in the case of a verb, the altered form table 228 stores an original form of the verb, a third person singular form formed by adding the letter "s" of the third person singular to the original form of the verb, a past tense of the verb, a past participle form of the verb, a present progressive form of the verb and the like. For example, as shown in FIG. 3, in the case of the verb "get", "get", "gets", "got", "getting", "gotten" and the like are stored in the altered form table 228 as related to the verb "get". Hereupon, the relation between the original word and the words in the altered form, where they are related to each other, is called as an "equal" relation. For example, "get" and "got" are called as equal words.

FIG. 3C is a diagram showing a data structure example of the word level table 230. The word level table 230 stores words and levels which indicate difficulty of the words as related to each other. The difficulty of the levels becomes higher in accordance with the alphabetical order of "A", "B", "C" . . . . Moreover, when the difficulty is compared between the level "A" and the level "B", the difficulty of the level "A" is regarded as larger. Thereafter, as the difficulty proceeds as "B", "C", "D", . . . , the difficulty becomes smaller in the order of the alphabet of "B", "C", "D" . . . toward the end.

The example sentence search program 24 is a program for making the CPU 10 execute an example search process for searching in the English-Japanese dictionary DB 22 for an example sentence on the basis of a search word input and a condition assigned by a user, and for making the display 50 display the searched example sentence thereon.

The entry word limit program 242 is a subroutine program included in the example sentence search program 24. The entry word limit program 242 is a program for making the CPU 10 execute an entry word limit process capable of selecting an example sentence having a reference entry word equal to a search word included in a search phrase among once-extracted example sentences. Hereupon, the search word indicates each word included in a plurality of words constituting the input search phrase. Moreover, a set of the input plurality of search words is called a plural search phrase. Moreover, simply, a search phrase indicates a phrase input by the user for a search purpose, including both the case where a search phrase is constituted of one word and the case where a search phrase is constituted of a plurality of words (namely, a plural search phrase).

The word level assigning program 244 is a subroutine program included in the example sentence search program 24. The word level assigning program 244 is a program for making the CPU 10 execute a word level assigning process for extracting an example sentence on the basis of an assigned word level among the once-extracted example sentences.

The example sentence difficulty assigning program 246 is a subroutine program included in the example sentence search program 24. The example sentence difficulty assigning program 246 is a program for making the CPU 10 execute an example sentence difficulty assigning process for selecting an example sentence according to a difficulty of the assigned example sentence among the once-extracted example sentences.

The collocation importance assigning program 248 is a subroutine program included in the example sentence search program 24. The collocation importance assigning program 248 is a program for making the CPU 10 execute a collocation importance assigning process for selecting an example sentence according to importance of an assigned collocation among the once-extracted example sentences.

The RAM 30 includes a memory area for temporarily storing various types of programs to be executed by the CPU 10, data concerning execution of these programs, and the like. In the present embodiment, the memory area includes a search phrase storage area 302, an example sentence number storage area 304, a first operation area 306, a second operation area 308 and a third operation area 310.

In the search phrase storage area 302, a search phrase input at the input unit 40 is stored. In the example sentence number storage area 304, a list of the numbers of extracted example sentences is stored. In the first operation area 306, the second operation area 308 and the third operation area 310, data to be used temporality by each program is stored.

The input unit 40 is an input device equipped with a key group in order to input letters such as kana, alphabet or the like, to select a function, and the like. The input unit 40 outputs a signal of a pushed down key to the CPU 10. By means of key input at the input unit 40, a means to input a search phrase, to select a dictionary mode, to instruct search execution and the like is achieved. Incidentally, the input unit 40 corresponds to the key group 5 shown in FIG. 1. Moreover, the input unit 40 is not limited to the key group 5, but may be a touch panel or the like.

The display 50 displays various types of screens on the basis of display signals input from the CPU 10. The display 50 is composed of an LCD (liquid crystal display) or the like. Incidentally, the display 50 corresponds to the display 3 shown in FIG. 1.

Next, operation of the electronic dictionary 1 will be described.

Figure 5:
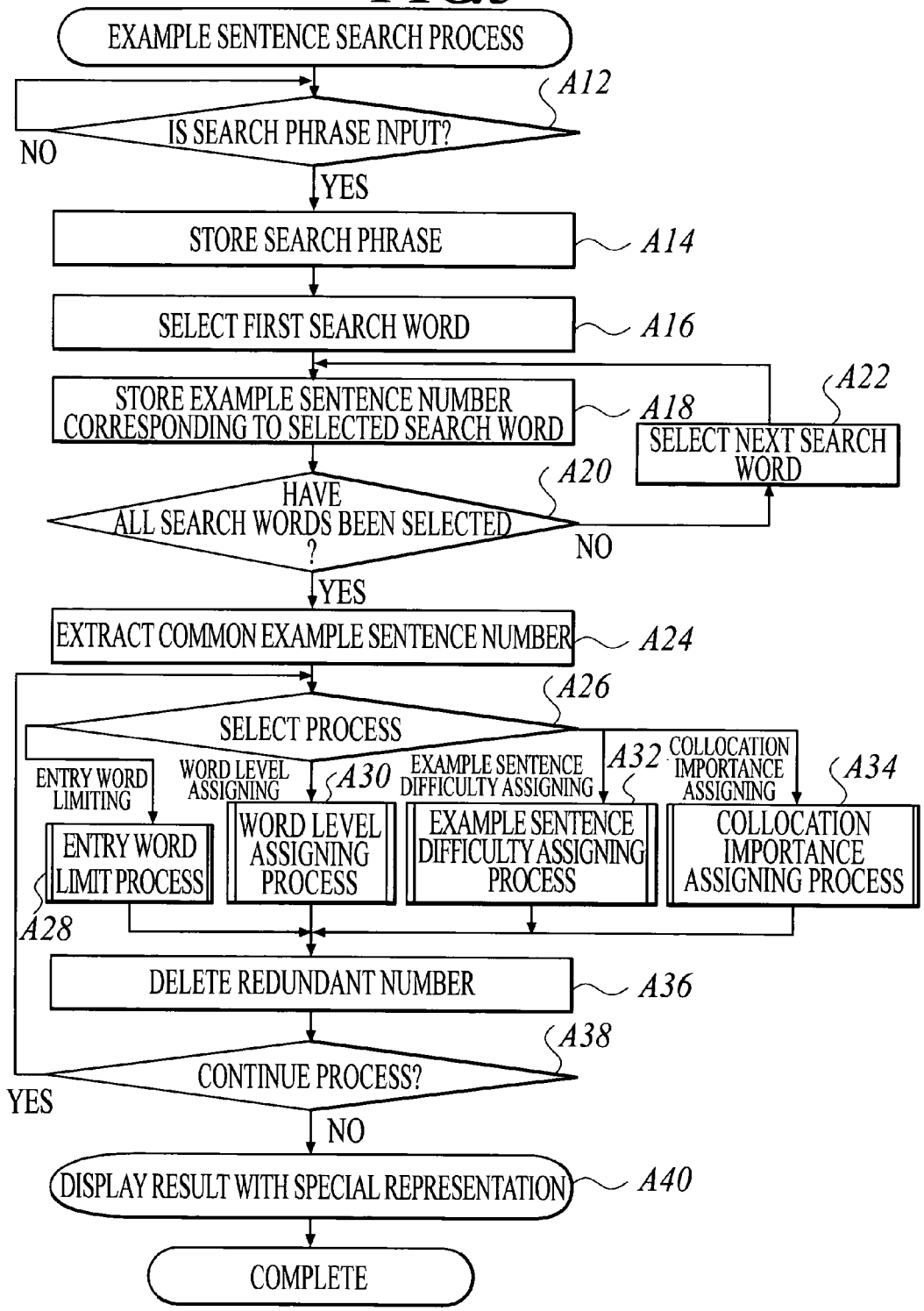
FIG. 5 is a diagram showing an operation flow of an example sentence search process.

FIG. 5 is a flowchart for describing operation of the example sentence search process executed by the CPU 10 in accordance with the example sentence search program 24. With reference to FIG. 5, the flow of the example sentence search process will be described First, when a user inputs a search phrase composed of one or a plurality of search words in a search phrase input area P100 (Step A12; Yes), the CPU 10 stores the input search phrase in the search phrase storage area 302 (Step A14).

Then, the CPU 10 selects a search word which is the first word in the input search phrase (Step A16), and extracts an example sentence number corresponding to the search word from the word and example sentence table 226 to store the extracted example sentence numbers in the first operation area 306 (Step A18). Next, when there is a search word remaining (Step A20; No), the CPU 10 selects the next search word (Step A22), and executes a similar process. After the completion of the extraction of the example sentence numbers on all of the search words (Step A20; Yes), the CPU 10 extracts a common number of the example sentence numbers in each search word to store the extracted common number in the example sentence number storage area 304 (Step A24).

For example, when a search phrase "look&like" is input, the first search word is "look", and the next search word is "like". First, the CPU 10 extracts the example sentence numbers ". . . , 6, . . . , 24, . . . " corresponding to "look" from the word and example sentence table 226 to store the extracted example sentence numbers in the first operation area 306. Next, the CPU 10 extracts the example sentence numbers ". . . , 24, . . . , 48, . . . " corresponding to "like" from the word and example sentence table 226 to store the extracted example sentence numbers in the first operation area 306. Information stored in the first operation area 306 at this time is in the state as shown in FIG. 7A.

Next, the CPU 10 extracts all the common example sentence numbers in every search word among the example sentence numbers of the search words stored in the first operation area 306, and stores the extracted common example sentence numbers in the example sentence number storage area 304. For example, from the state of the first operation area 306 shown in FIG. 7A, the CPU 10 extracts example sentence numbers common in each of "like" and "look". Hereupon, the example sentence numbers "24, 126, 153, 156, 315 . . . " are extracted and stored in the example sentence number storage area 304. Information stored in the example sentence number storage area 304 at this time is in the state as shown in FIG. 7B.

Figure 16:
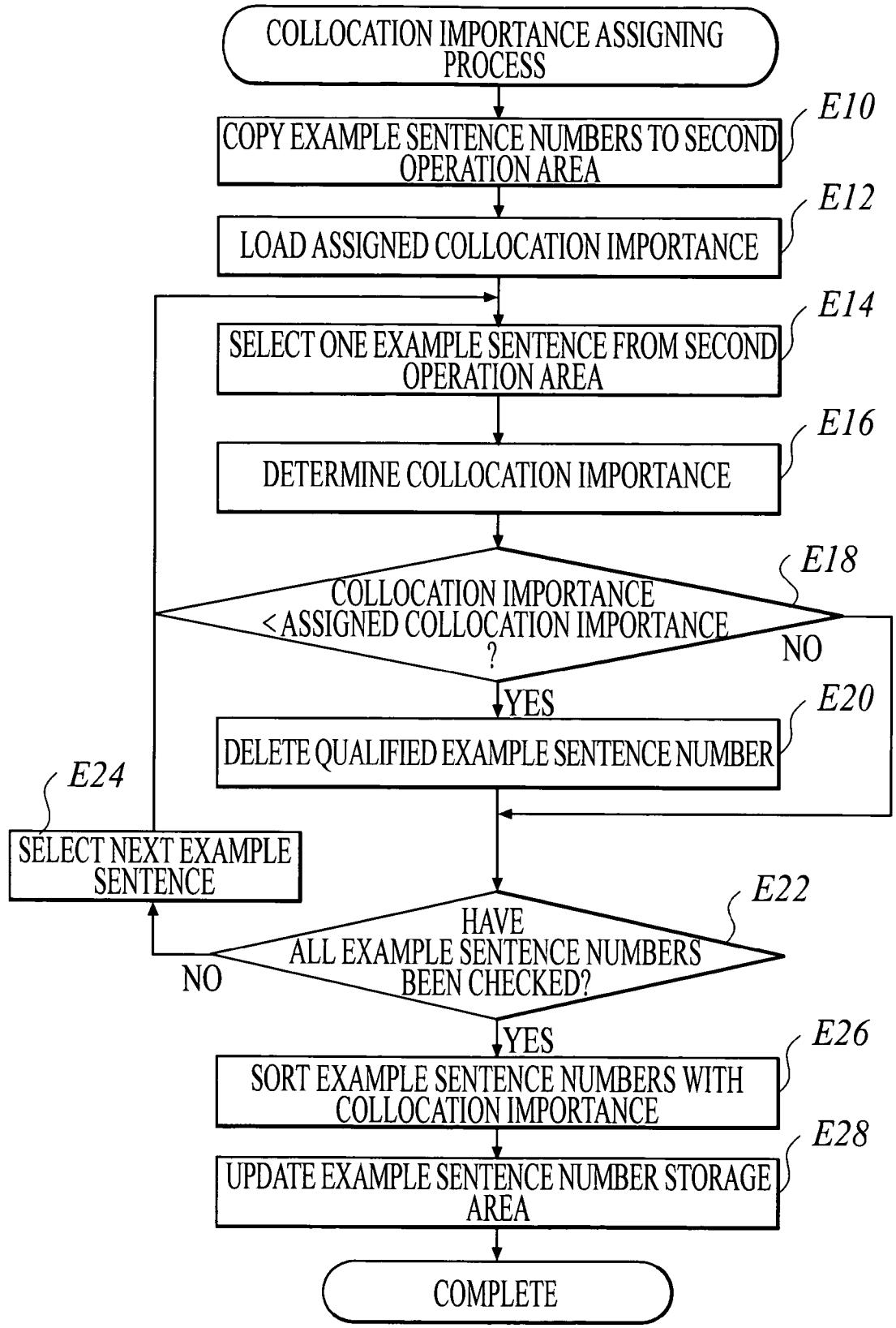
FIG. 16 is a diagram showing an operation flow of a collocation importance assigning process.

Next, the CPU 10 executes a process corresponding to the process selected by the user (Step A26). Hereupon, the processes to be selected by the user include an entry word limit process (Step A28; FIG. 6), a word level assigning process (Step A30; FIG. 12), an example sentence difficulty assigning process (Step A32; FIG. 14) and a collocation importance assigning process (Step A34; FIG. 16). The details of each process will be described later.

Figure 8A:
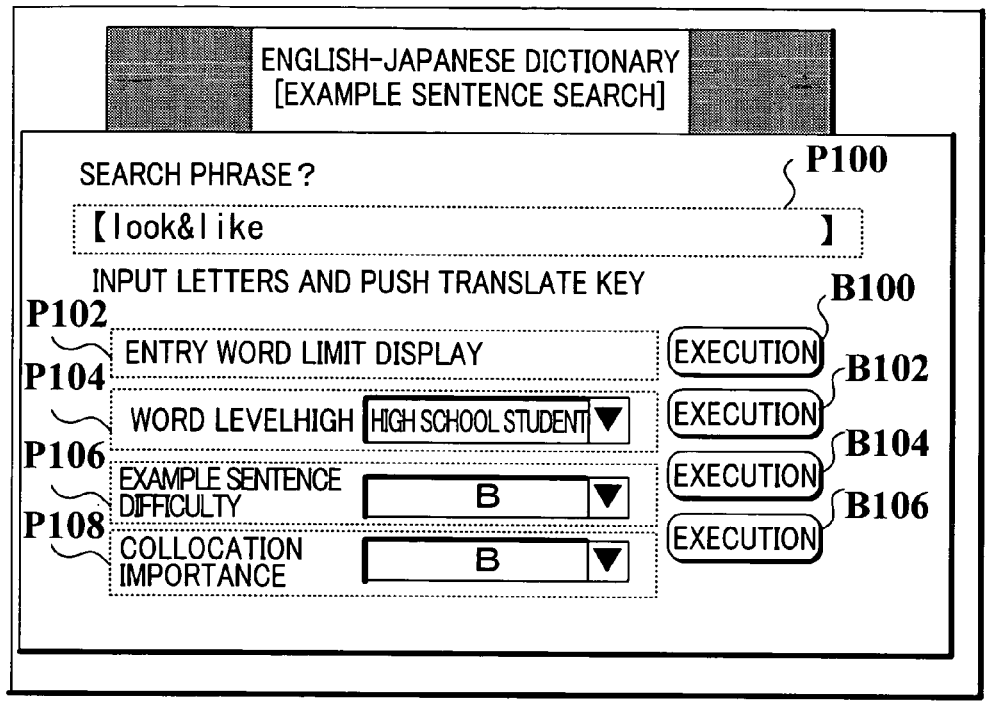
FIGS. 8A and 8B are views showing a screen for assigning an input and an extraction condition of a search word (FIG. 8A), and a display example when the entry word limit process is executed (FIG. 8B), respectively.

An example of the input screen in Step A26 is shown in FIG. 8A. In FIG. 8A, when the user inputs a search phrase into the search phrase input area P100, and then selects any one of execution buttons B100, B102, B104 and B106 by the use of the keys in the various key group 5, the CPU 10 executes the selected process. To put it concretely, when the execution button B100 is selected, the CPU 10 executes the entry word limit process. When the execution button B102 is selected, the CPU 10 executes the word level assigning process. When the execution button B104 is selected, the CPU 10 executes the example sentence difficulty assigning process. When the execution button B106 is selected, the CPU 10 executes the collocation importance assigning process.

Next, when there are the same numbers redundantly in the example sentence numbers stored in the example sentence number storage area 304, the CPU 10 unifies the redundant numbers into one and deletes the rest (Step A36).

In this sate, the CPU 10 awaits a user's instruction indicating whether to display the example sentence numbers or to repeat the process of Steps A28 to A34. At this time, the CPU 10 may display a window for an instruction input while awaiting the input. Then, when the instruction to repeat the process is input (Step A38; Yes), the CPU 10 makes the process proceed to Step A26, and executes the process of Steps A26 to A38 once again.

On the other hand, when the instruction not to repeat the process is input (Step A38; No), the CPU 10 loads an example sentence corresponding to the example sentence numbers stored in the example sentence number storage area 304 in the storing order from the example sentence table 224. Then, the CPU 10 performs special representation on a part of the letter string equal to the search phrase stored in the search phrase storage area 302 among the letter strings of the loaded example sentences to display the part of the letter string on the display 50.

For example, when an example sentence number "24" is stored in the example sentence number storage area 304, the CPU 10 searches in the example sentence table 224 for an example sentence having the example sentence number "24" to display "The water . . . ", which is an example sentence having the example sentence number "24", on the display 50. Moreover, at that time, the CPU 10 performs special representation on a part the letter string equal to the search phrase. The special representation may be in any form as long as the display form can be visually different from the other parts, such as, an underline, a font change, a color change or the like.

Next, operation of the electronic dictionary 1 when the user selects the entry word limit process in Step A26 of the example sentence search process (FIG. 5) will be described. Moreover, concrete examples will be suitably described with reference to data examples to be stored in each storage area of the RAM 30 and display screen examples.

When a search phrase is input into the search phrase input area P100 and then the execution button B100 is selected in the input screen in FIG. 8A in Step A26 in the example sentence search process (FIG. 5), the CPU 10 begins the execution of the entry word limit program 242 to execute the entry word limit process.

In FIG. 6, first, the CPU 10 copies the example sentence numbers stored in the example sentence number storage area 304 to the second operation area 308 (Step B10). Next, the CPU 10 loads the first search word among the search words stored in the search phrase storage area 302 (Step B12). Then, the CPU 10 selects one of the example sentence numbers stored in the second operation area 308 (Step B14). Next, the CPU 10 refers to the example sentence table 224 to load the reference entry word of the example sentence corresponding to the selected example sentence number (Step B16), and examines whether the search word is equal to the reference entry word or not (Step B18).

In regard to the processes up to this point will be described with reference to a concrete example of executing the entry word limit process with the words "look" and "like" as a search word. First, the example sentence number storage area 304 stores example sentence numbers shown in FIG. 7B.

The CPU 10 copies example sentence numbers stored in the example sentence number storage area 304 to the second operation area 308 (Step B10). FIG. 7C(i) shows an example of the example sentence numbers stored in the second operation area 308 in this state. The second operation area 308 stores the example sentence numbers "24, 126, 153, 156, 315 . . . ", which are common example sentence numbers in the search words "look" and "like". Next, the CPU 10 loads the first search word (Step B12). Since the words "look" and "like", have been input here, the first search word is the word "look". Next, the CPU 10 selects one, "24", among the example sentence numbers stored in the second operation area 308. Then, the CPU 10 refers to the example sentence table 224 to load a reference entry word of the example sentence (Step B16).

Returning the description to the flowchart of FIG. 6. The CPU 10 next refers to the altered form table 228 to judge whether the search word and the reference entry word are equal or not (Step B18). When the search word and the reference entry word are equal (Step B18; Yes), the CPU 10 adds the qualified example sentence number at the end of the third operation area 310 (Step B20). When the search word and the entry word are not equal, the CPU 10 does not execute any process (Step B18; No).

Then, when the CPU 10 has not judged on all the example sentence numbers yet (Step B22; No), the CPU 10 selects the next example sentence number stored in the second operation area 308, and proceeds to the next example sentence (Step B24). Then, the CPU 10 repeatedly performs the process of Steps B16 to B22. When the CPU 10 has completed the process on all the example sentence numbers (Step B22; Yes), the CPU 10 judges whether all the search words have been compared or not. When there are some search words remained to be compared (Step B26; No), the CPU 10 repeatedly performs the process of Steps B14 to B26 to the next search word (Step B28). When there is no search word left for performing the process on (Step B26; Yes), the CPU 10 updates the example sentence number storage area 304 with the example sentence numbers stored in the third operation area 310 (Step B30), and completes the entry word limit process.

Returning to the concrete example, the processes up to this point will be described. When the second operation area 308 and the third operation area 310 are in the state of FIG. 7C(i) as described above, the numbers "24, 126, 153, 156 and 315" are stored in the second operation area 308, and nothing is stored in the third operation area 310. In this state, first, the CPU 10 judges whether the first search word "look" and the reference entry word are equal or not. Since the reference entry words of the example sentence numbers "153" and "156" are equal to "look" according to the example sentence table 224 in FIG. 4A, the example sentence numbers "153" and "156" added to the third operation area 310 (FIG. 7C(ii)).

Figure 8B:
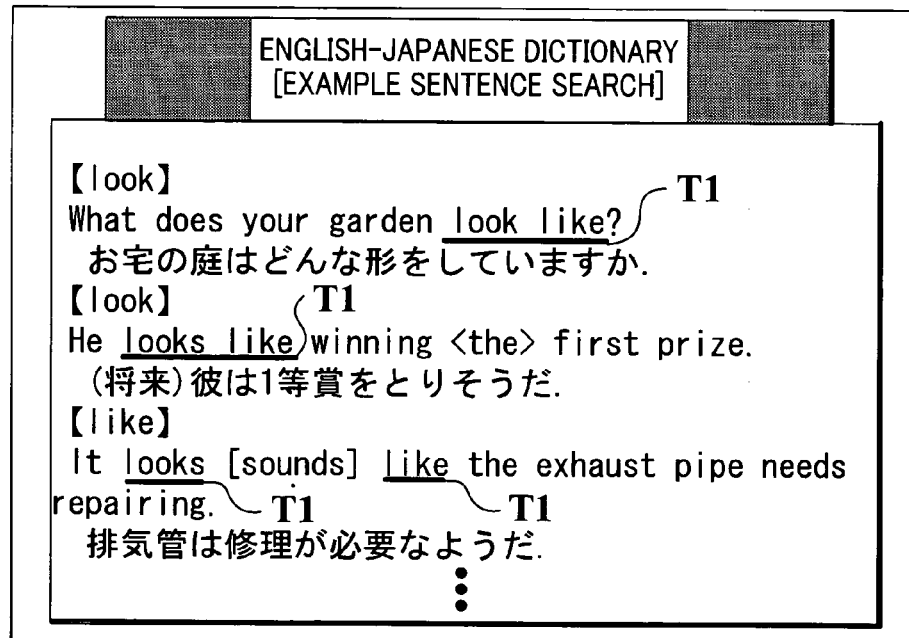

Next, the CPU 10 refers to the altered form table 228 to judge whether the search word "like" and the reference entry word are equal or not (Step B18). Here, since the reference entry word of the example sentence number "126" is equal to the search word "like", the CPU 10 adds the example sentence number "126" to the end of the third operation area 310 (Step B20) (FIG. 7C(iii)). Then, the CPU 10 updates the example sentence number storage area 304 with the example sentence number stored in the third operation area 310 (Step B30), and completes the entry word limit process. After that, the CPU 10 restarts the example sentence search process from Step A36. A screen example displayed on the display 50 as a result at this time is shown in FIG. 8B. In FIG. 8B, the example sentences having the reference entry word "look" equal to the search word "look" are displayed first, and the example sentences having the reference entry word "like" equal to the search word "like" are displayed next in the order of the input search phrases. Moreover, parts of the letter string equal to the search words "look" and "like" are displayed with underlines as the special representation T1 (Step A40).

Next, an example of the case where words "got" and "up" are input as a search phrase and then the entry word limit process is executed will be described with reference to an example of the example sentence table 224 shown in FIG. 9A and an example of the word and example sentence table 226 shown in FIG. 9B.

Before the entry word limit process, example sentence numbers of example sentences respectively using the search words "got" and "up" are stored in the first operation area 306 in the example sentence search process. Then, the common example sentence numbers are stored in the example sentence number storage area 304 (FIGS. 10A and 10B).

Then, in the entry word limit process, first, the CPU 10 copies the example sentence numbers stored in the example sentence number storage area 304 to the second operation area 308 (Step B10). A figure showing the state at this time is FIG. 10C(i). The state shown in FIG. 10C(i) is the state in which the example sentence numbers "36, 172, 198 and 210" are stored in the second operation area 308 and nothing is stored in the third operation area 310.

Next, the CPU 10 loads the first search word "get" (Step B12). Then, the CPU 10 judges whether the search word and the reference entry word are equal or not. The judgment of whether the search word and the reference entry word are equal or not is performed with reference to the altered form table 228 (Step B18). To put it concretely, for example, the altered form table 228 stores a word "get" as an altered form with respect to the input word "got" in FIG. 3B showing an example of the altered form table 228. Accordingly, the CPU 10 judges that the word "got" and the word "get" are equal.

Figure 11:
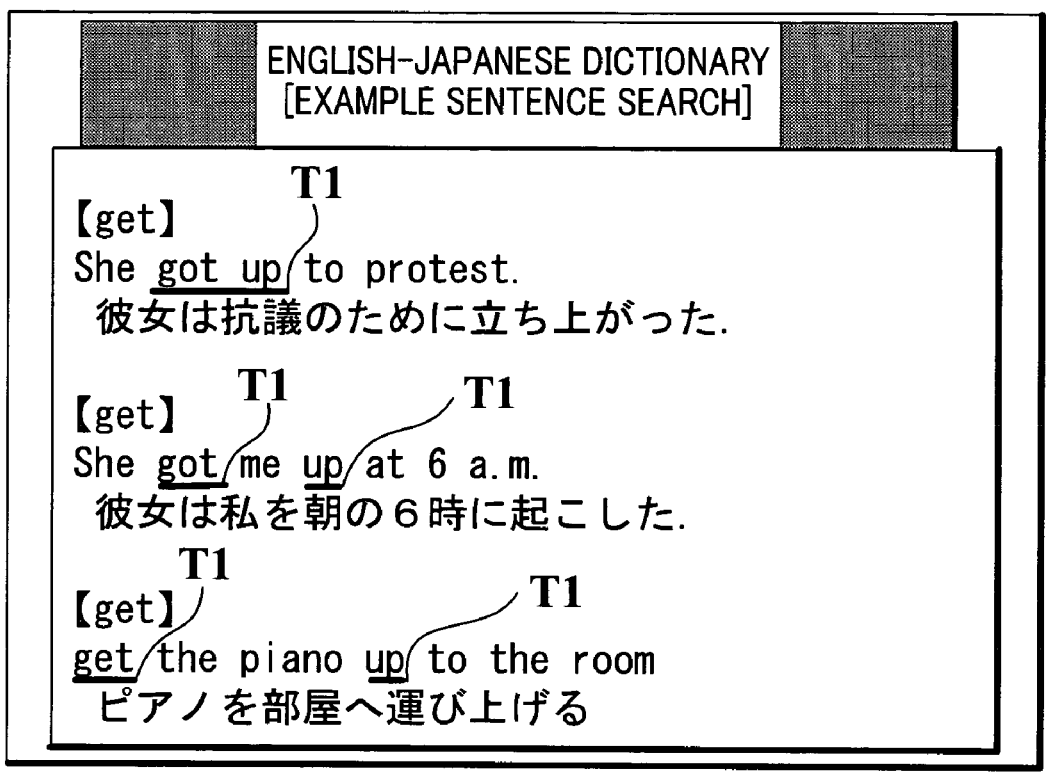
FIG. 11 is a view showing a display example when the entry word limit process is executed.

Here, FIG. 10C(ii) shows the state of the third operation area 310 when the CPU 10 refers to the example sentence table 224 of FIG. 9A to select example sentence numbers of example sentences having the reference entry word "get" equal to the search word "got". Further, FIG. 10C(iii) shows the state in which the CPU 10 adds the example sentence number of the example sentence having the reference entry word "up" equal to the search word "up" to the third operation area 310. Then, the CPU 10 updates the example sentence number storage area 304 with the example sentence numbers stored in the third operation area 310. FIG. 11 is a screen example in which example sentences are displayed on the display 50 by the use of the example sentence numbers stored in the example sentence number storage area 304. In FIG. 11, the example sentences having the reference entry word "get" equal to the search word "got" are displayed first and the example sentences having the reference entry word "up" equal to the search word "up" are displayed next in the order of the input search words. Moreover, parts of the letter string equal to the search words "got" and "up" are underlined as the special representation T1.

As described above, according to the entry word limit process, it is possible to display only an example sentence having a search word as a reference entry word on the basis of the order of the search words. Consequently, it is possible to display the example sentences corresponding to the reference entry words of the example sentences having strong relevance to the input search words, and thereby it is possible to achieve displaying of suitable example sentences.

Next, operation of the electronic dictionary 1 when the user selects the word level assigning process in Step A26 in the example sentence search process (FIG. 5) will be described. Moreover, an example of data stored in each storage area of the RAM 30 and an example of a case where an search phrase "look&like" is input into the search phrase input area P100 of FIG. 8A will be described as a suitable concrete example.

After the search word "look&like" is input in the input screen of FIG. 8A, when a word level is assigned in a pull-down menu P104 and an execution button B102 is selected by the use of the keys in the various key group 5 in Step A26 in the example sentence search process (FIG. 5), the CPU 10 begins to execute the word level assigning program 244 (FIG. 12), and executes a word level assigning process. In the word level assigning process, a word level to be assigned indicates a level to be displayed as a junior high school student level, a high school student level, a university student level . . . and so forth in the pull-down menu P104. Each of the levels is respectively set as a level "A", a level "B", a level "C" . . . and so forth inside. Moreover, the word level table 230 stores a word level of each word correspondingly. Incidentally, the pull-down menu is a menu in which one item can be selected among a plurality of items.

In FIG. 12, first, the CPU 10 copies example sentence numbers stored in the example sentence number storage area 304 to the second operation area 308 (Step C10). An example of the storage content in the second operation area 308 at this time is shown in FIG. 13A(i). Next, the CPU 10 loads a level assigned by the user (Step C12). For example, in the pull-down menu P104 of FIG. 8A, since a word level is assigned as "high-school student", the CPU 10 judges that the level "B" corresponding to the high-school student level is the level assigned by the user. In the following, a level assigned by the user is called as an assigned level.

Next, the CPU 10 selects one of the example sentence numbers stored in the second operation area 308 (Step C14), and determines an example sentence word level (Step C16). Hereupon, the example sentence word level is a difficulty of an example sentence whose degree is judged according to a word level of each word included in the example sentence, and indicates the smallest (the most difficult) word level of each word included in the example sentence. For example, as shown in FIG. 13B, in a case of an example sentence of the example sentence number "24", a level loaded from the word level table 230 is assigned to each word included in the example sentence. Hereupon, since the word "calm" has a word level "B" and all the other words have a word level "A", an example sentence word level of the example sentence number "24" is set "B". Moreover, in a case of an example sentence of the example sentence number "153", since word levels of all the words are "A", an example sentence word level of the example sentence of the example sentence number "153" is set "A". Incidentally, in the present embodiment, the smallest (the most difficult) word level among the word levels of the words included in the example sentence is set to be an example sentence word level of the example sentence. However, the largest (the easiest) word level of an example sentence may be set to be an example sentence word level of the example sentence.

Next, the CPU 10 compares a word level of the example sentence with the assigned level (Step C18). When the example sentence word level is smaller than the assigned level, the CPU 10 deletes the qualified example sentence number, which is judged as smaller (more difficult) than the assigned level, from the example sentence numbers stored in the second operation area 308 (Step C18; Yes). For example, when the user assigns the high-school student level (level B), an example sentence having the example sentence word level of the university student level (the level C) is not displayed.

Then, the CPU 10 judges whether all the example sentence numbers have been processed or not. If all the example sentence numbers have not been processed yet (Step C22; No), the CPU 10 selects the next example sentence number stored in the second operation area 308, and the process of the CPU 10 proceeds to the next example sentence (Step C24) to perform the process of Steps C14 to C22 repeatedly. If the processes of all the example sentence numbers have been completed (Step C22; Yes), the CPU 10 sorts the example sentence numbers stored in the second operation area 308 by the example sentence word level (Step C26), and updates the example sentence number storage area 304 (Step C28). For example, even when the example sentence numbers are stored in the second operation area 308 as shown in FIG. 13A(i) in Step C10, the example sentence numbers are sorted in conformity with the example sentence word levels in Step C26. Consequently, the example sentence numbers stored in the second operation area 308 are updated to be in the order shown in FIG. 13A(ii).

Here, FIG. 13C is an example of the screen displayed as a process result on the basis of the updated example sentence number storage area 304. Similar to the process result screen of the entry word limit process shown in FIG. 8B, parts of the letter string equal to the search word are underlined as the special representation T1.

Incidentally, it is possible to set the judgment standard in Step C18 as "example sentence word level ≠ assigned level", and thereby to perform a process of deleting the example sentence numbers of the example sentences having example sentence word levels not equal to the assigned level from the second operation area 308. In that case, only example sentences having example sentence numbers equal to the assigned level can be displayed.

As described above, according to the word level assigning process, a suitable example sentence can be displayed on the basis of the assigned word level. That is, since an example sentence using words difficult for the user is not displayed, a suitable example sentence which is fitted to the user's intention can be displayed. Moreover, since the displayed example sentences are displayed in the order of the example sentence word levels, for example, the example sentences are displayed from the easiest one. Then, even when a plurality of example sentences are simultaneously displayed, operation to confirm the contents of each example sentence becomes easy.

Next, the example sentence difficulty assigning process will be described with reference to the flowchart of FIG. 14. Moreover, as a data example to be stored in each storage area of the RAM 30 and a display screen example, the case where an search phrase "look&like" is input into the search phrase input area P100 of FIG. 8A will be described as a suitable concrete example.

After the search word "look&like" is input in the input screen of FIG. 8A, when an example sentence difficulty is assigned at the pull-down menu P106 and the execution button B104 is selected in Step A26 in the example sentence search process (FIG. 5), the CPU 10 begins to execute the example sentence difficulty assigning program 246, and executes an example sentence difficulty assigning process. Hereupon, the example sentence difficulty indicates a level to be displayed as "A", "B", "C" . . . and so forth in the pull-down menu P106. Each of the levels is respectively set as a level "A", a level "B", a level "C" . . . and so forth inside. Moreover, each of the example sentence difficulties is stored as "example sentence difficulty" as related to each of the example sentences as shown in the example sentence table 224 of FIG. 4A.

In FIG. 14, first, the CPU 10 copies example sentence numbers stored in the example sentence number storage area 304 to the second operation area 308 (Step D10). An example of the storage content of the second operation area 308 at this time is shown in FIG. 15A(i). Next, the CPU 10 loads a difficulty assigned by the user (Step D12). For example, in the pull-down menu P106 of FIG. 8A, since an example sentence difficulty is assigned as "B", the CPU 10 judges that the difficulty "B" is a difficulty assigned by the user. In the following, a difficulty assigned by the user is called as an assigned difficulty.

Next, the CPU 10 selects one of the example sentence numbers stored in the second operation area 308 (Step D14), and loads its example sentence difficulty (Step D16). To put it concretely, for example, with regard to an example sentence having an example sentence number "24", the CPU 10 refers to the example sentence table 224 of FIG. 4A and loads the example sentence difficulty "B".

Next, the CPU 10 compares the example sentence difficulty with the assigned difficulty. When the example sentence difficulty is smaller (more difficult) than the assigned difficulty (Step D18; Yes), the CPU 10 deletes the qualified example sentence number, which has been judged as smaller (more difficult), among the example sentence numbers stored in the second operation area 308 (Step D20). For example, when the assigned difficulty is "B", example sentences having the example sentence difficulty of "C", "D" or the like are not displayed;

Then, the CPU 10 judges whether all the example sentence numbers have been processed or not. If all the example sentence numbers have not been processed (Step D22; No), the CPU 10 selects the next example sentence number stored in the second operation area 308, and the CPU 10 proceeds to the process on the next example sentence (Step D24) to perform the process of Steps D14 to D22 repeatedly. If the process on all the example sentence numbers has been completed (Step D22; Yes), the CPU 10 sorts the example sentence numbers stored in the second operation area 308 with their example sentence difficulties (Step D26), and updates the example sentence number storage area 304 (Step D28). For example, even when example sentence numbers are stored in the second operation area 308 in the order shown in FIG. 15A(i) in Step D10, the example sentence numbers are sorted with the levels of the example sentence difficulties in Step D26. Consequently, the example sentence numbers stored in the second operation area 308 are updated in the order shown in FIG. 15A(ii).

Here, FIG. 15B is an example of the screen displayed on the basis of the updated example sentence number storage area 304 as a process result. Similar to the process result screen of the entry word limit process shown in FIG. 8B, parts of letter strings equal to the search words are underlined as the special representation T1.

Incidentally, by setting the judgment standard in Step D18 as "example sentence difficulty≠assigned difficulty", deletion of the example sentence numbers of the example sentences having an example sentence difficulty different from the assigned difficulty from the second operation area 308 may be performed. In that case, only the example sentences having the example sentence numbers equal to the assigned difficulty can be displayed.

As described above, in the example sentence difficulty assigning process, it is possible to display a suitable example sentence on the basis of the assigned example sentence difficulty. That is, since an example sentence difficult for a user is not displayed, a suitable example sentence corresponding to user's intension can be displayed. Moreover, since the displayed example sentences are displayed in the order of the example sentence difficulties, for example, the example sentences are displayed from an example sentence having the easiest example sentence difficulty. Consequently, even when a plurality of example sentences are displayed at a time, confirmation operation of the content of each example sentence becomes easy.

Next, the collocation importance assigning process will be described with reference to the flowchart of FIG. 16. Moreover, as a data example to be stored in each storage area of the RAM 30 and a display screen example, the case where an search phrase "look&like" is input into the search phrase input area P100 of FIG. 8A will be described as a suitable concrete example.

After the search phrase "look&like" is input in the input screen of FIG. 8A, when collocation importance is assigned at the pull-down menu P108 and the execution button B106 is selected in Step A26 in the example sentence search process (FIG. 5), the CPU 10 begins to execute the collocation importance assigning program 248, and begins to execute a collocation importance assigning process. Hereupon, the collocation importance indicates a level to be displayed as "A", "B", "C" . . . and so forth in the pull-down menu P108. Each of the levels is respectively set as a level "A", a level "B", a level "C" . . . and so forth inside. Moreover, each collocation importance is stored as related to each collocation included in each example sentence as "collocation importance" as shown in the example sentence table 224 of FIG. 4A. Then, the collocation importance corresponding to the search phrase among the stored collocation importance is set as the collocation importance of the qualified example sentence to the search phrase.

In FIG. 16, first, the CPU 10 copies example sentence numbers stored in the example sentence number storage area 304 to the second operation area 308 (Step E1). An example of the storage content of the second operation area 308 at this time is shown in FIG. 17A(i). Next, the CPU 10 loads an importance assigned by the user (Step E12). For example, in the pull-down menu P108 of FIG. A, since a collocation importance is assigned as "B", the CPU 10 judges that the importance "B" is an importance assigned by the user. In the following, an importance assigned by the user is called as an assigned importance.

Next, the CPU 10 selects one of the example sentence numbers stored in the second operation area 308 (Step E14), and refers to the example sentence table 224 to determine a collocation importance of an example sentence of the selected example sentence number (Step E16). To put it concretely, for example, when the example sentence table 224 of FIG. 4A is referred to, the example sentence table 224 stores the example sentence of an example sentence number "24" including words "look" and "like" input as the search phrase as the words having the importance "B" with regard to the qualified example sentence. Therefore, the collocation importance of the qualified example sentence is determined as "B".

Next, the CPU 10 compares the collocation importance of the example sentence with the assigned importance. When the collocation importance of the example sentence is smaller (more difficult) than the assigned importance (Step E18;Yes), the CPU 10 deletes the qualified example sentence number, which is judged as smaller (more difficult) than the assigned importance, from the example sentence numbers stored in the second operation area 308 (Step C20). For example, when the assigned importance is "B", example sentences having the collocation importance of the example sentences of "C", "D" and the like are not displayed.

Then, the CPU 10 judges whether all the example sentence numbers have been processed or not. If all the example sentence numbers have not been processed yet (Step E22; No), the CPU 10 selects the next example sentence number stored in the second operation area 308, and the CPU 10 proceeds to the process on the next example sentence (Step E24) to perform the process of Steps E14 to E22 repeatedly. If the process on all the example sentence numbers has been completed (Step E22; Yes), the CPU 10 sorts the example sentence numbers stored in the second operation area 308 with the collocation importance of the example sentences (Step E26), and the CPU 10 updates the example sentence number storage area 304 (Step E28). For example, even when the example sentence numbers are stored in the second operation area 308 in the order shown in FIG. 17A(i) in Step E10, the example sentence numbers are sorted with the levels of the collocation importance of the example sentences in Step E26. Consequently, the example sentence numbers stored in the second operation area 308 are updated to be in the order shown in FIG. 17A(ii).

Here, FIG. 17B is an example of the screen displayed as a process result based on the updated example sentence number storage area 304. Similar to the process result screen of the entry word limit process shown in FIG. 8B, parts of letter strings equal to the search words are underlined as the special representation T1.

Incidentally, by setting the judgment standard in Step E18 as "collocation importance≠assigned importance", deletion of the example sentence numbers of the example sentences having collocation importance different from the assigned importance from the second operation area 308 may be performed. In that case, only example sentences having the importance equal to the assigned importance can be displayed.

As described above, according to the collocation importance assigning process, a suitable example sentence can be displayed on the basis of the assigned collocation importance. That is, since the example sentences including the collocations regarded as not important are not displayed on the basis of the collocation importance assigned by a user, a suitable example sentence which is fitted to the user's intention can be displayed. Moreover, since the displayed example sentences are displayed in the order of the collocation importance, for example, example sentences are displayed from an example sentence more important than the search phrase, the user can easily confirm the contents of the example sentences.

In the above, an embodiment of the present invention has been described, but the present invention is not limited to the contents of the above-described embodiment. The contents may be suitably changed without departing from the essence of the present invention. For example, for realizing a search for an example sentence including a collocation or an idiomatic phrase using the words "look" and "like" continuously, an input of a space between "look" and "like" may be applicable.

Figure 18A:
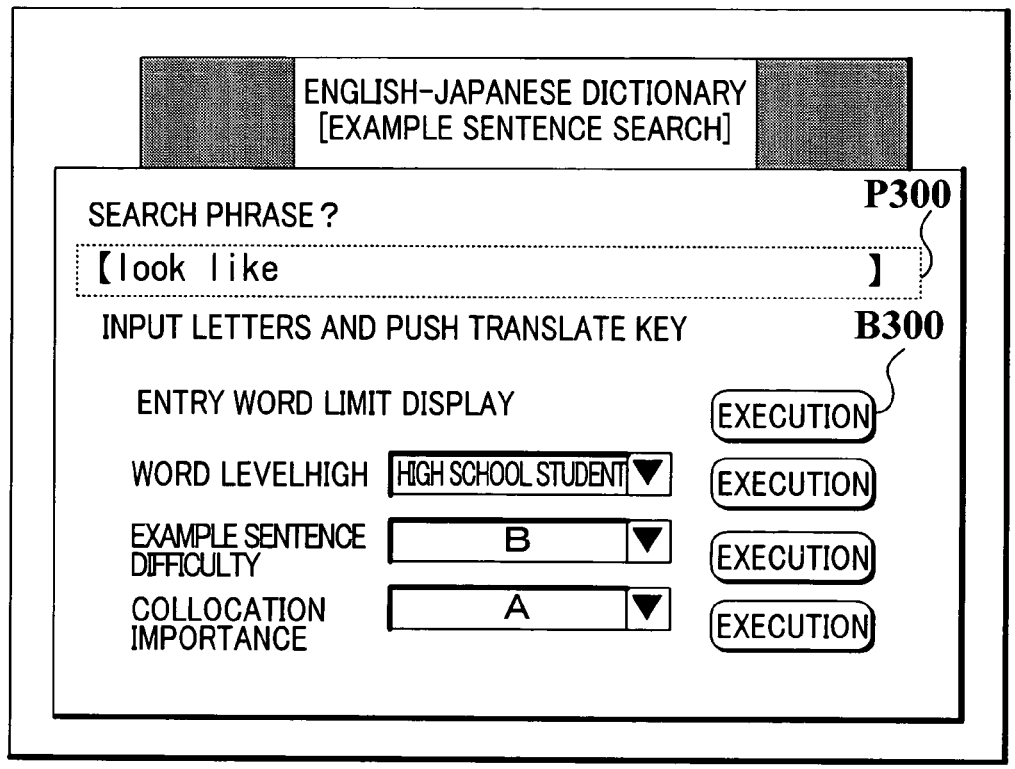
FIG. 18A is a view showing a screen for assigning an input and an extraction condition of a search word
Figure 18B:
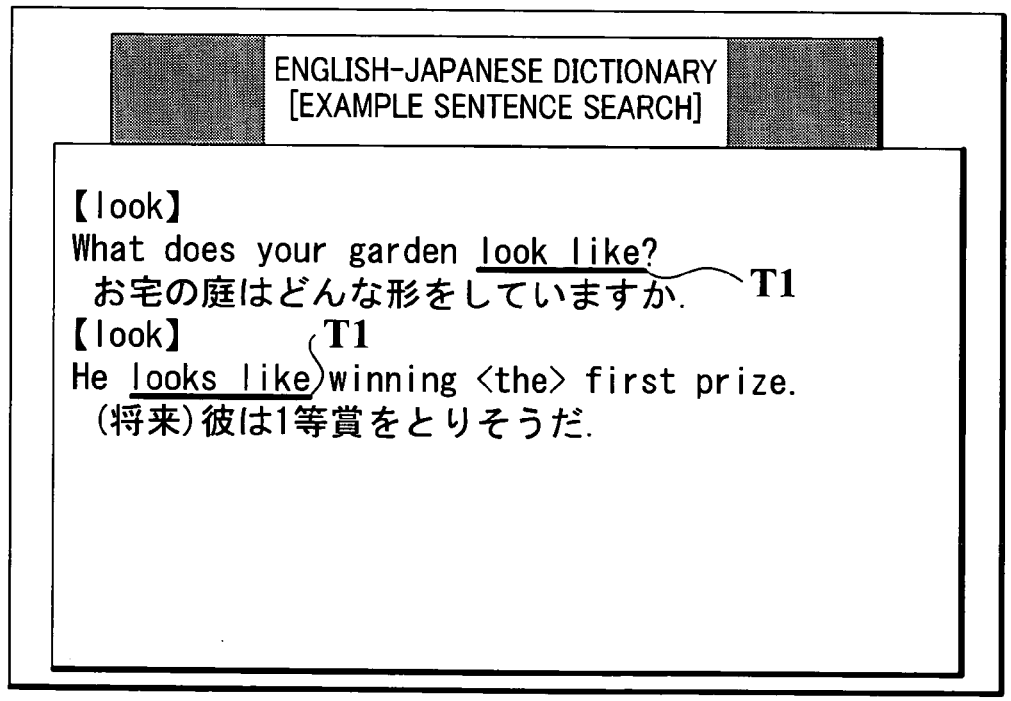
FIG. 18B is a view showing a display example when the entry word limit process is executed.

For example, FIG. 18A shows an example of the screen displayed on the display 50 in Step A12 in the example sentence search process. Hereupon, a search phrase including a space, such as "look like" is input into a search word input area P300. Then, when such a search phrase including a space is input, the CPU 10 extracts only an example sentence number of an example sentence using the search words "look" and "like" continuously in Step B18, and adds the qualified example sentence number to the end of the third operation area 310. Thereby, a search of an example sentence using search words continuously can be realized. FIG. 18B shows an example of the search result screen at this time. In FIG. 18B, only the example sentences using the words "look" and "like" continuously are displayed unlike the screen example of FIG. 8B, which is displayed by the input of "look&like". Consequently, it is possible to search for and display an example sentence conforming to an intention.

Second Embodiment

In the following, with reference to FIGS. 19 to 33B, a second embodiment of an information display control apparatus according to the present invention will be described in detail. Incidentally, in the following, the present invention will be described by exemplifying the case where the present invention is applied to a folding-type portable electronic dictionary being a kind of the information display control apparatus. However, the embodiment to which the present invention can be applied is not limited to the followings.

The portable electronic dictionary therein includes various types of electronic dictionary data (dictionary databases) such as data of a Japanese dictionary, an English-Japanese dictionary, a Japanese-English dictionary, a synonym dictionary, a proverb dictionary and the like. In its dictionary database, data for explaining entry words such as letter data, image data, motion picture data, voice data and the like is stored as related to the entry words. A user can make a commentary of a word displayed by selecting a type of the dictionaries and inputting a word. Incidentally, in the following, the case where the dictionary DB of an English-Japanese dictionary is incorporated in the electronic dictionary will be explained as an example.

Figure 19:
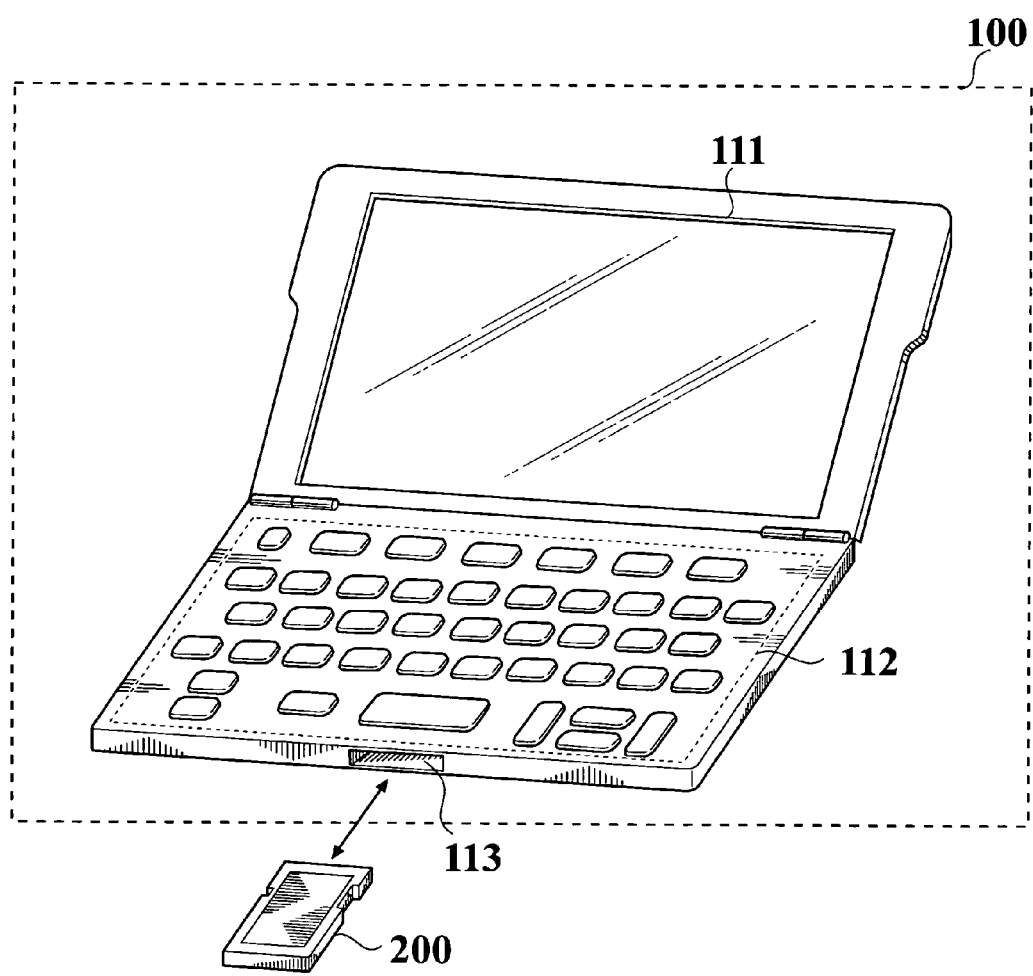
FIG. 19 is a view showing an example of a perspective schematic view of a portable electronic dictionary to which the present invention is applied.

FIG. 19 is an example of a perspective schematic view of the portable electronic dictionary 100. As shown in FIG. 19, the portable electronic dictionary 100 comprises a display screen ill and a various key group 112. The portable electronic dictionary 100 also comprises a built-in battery (not shown) or the like, and is cased with metal or resin.

The display screen 111 is a unit on which various kinds of data such as letters, marks and the like, necessary for using the portable electronic dictionary 100, are displayed according to the push of the various keys. The display screen 11 is a device such as an LCD (Liquid Crystal Display), an EL (electronic luminescent display) or the like, and is realized with a unit or a combination of a plurality of the devices.

Peculiar functions are respectively assigned to the keys constituting the various key group 112. A user operates the portable electronic dictionary 100 by pushing down these keys. To put it concretely, the various key group 5 is provided with letter input keys, a selection key to select a type of the dictionaries, a jump key to jump to an assigned word, an example display key to display an example of an assigned word, and the like.

Moreover, the portable electronic dictionary 100 comprises a slot 113 for a storage medium 200. The storage medium 200 is a storage medium for storing various types of dictionary databases, programs and the like. For example, the storage medium 200 is a memory card, a hard disk or the like. The slot 113 is a unit for mounting the storage medium 200 detachably to make it possible to write and loaded data on the storage medium 200. The slot 113 is suitably selected according to a type of the storage medium 200.

Figure 20:
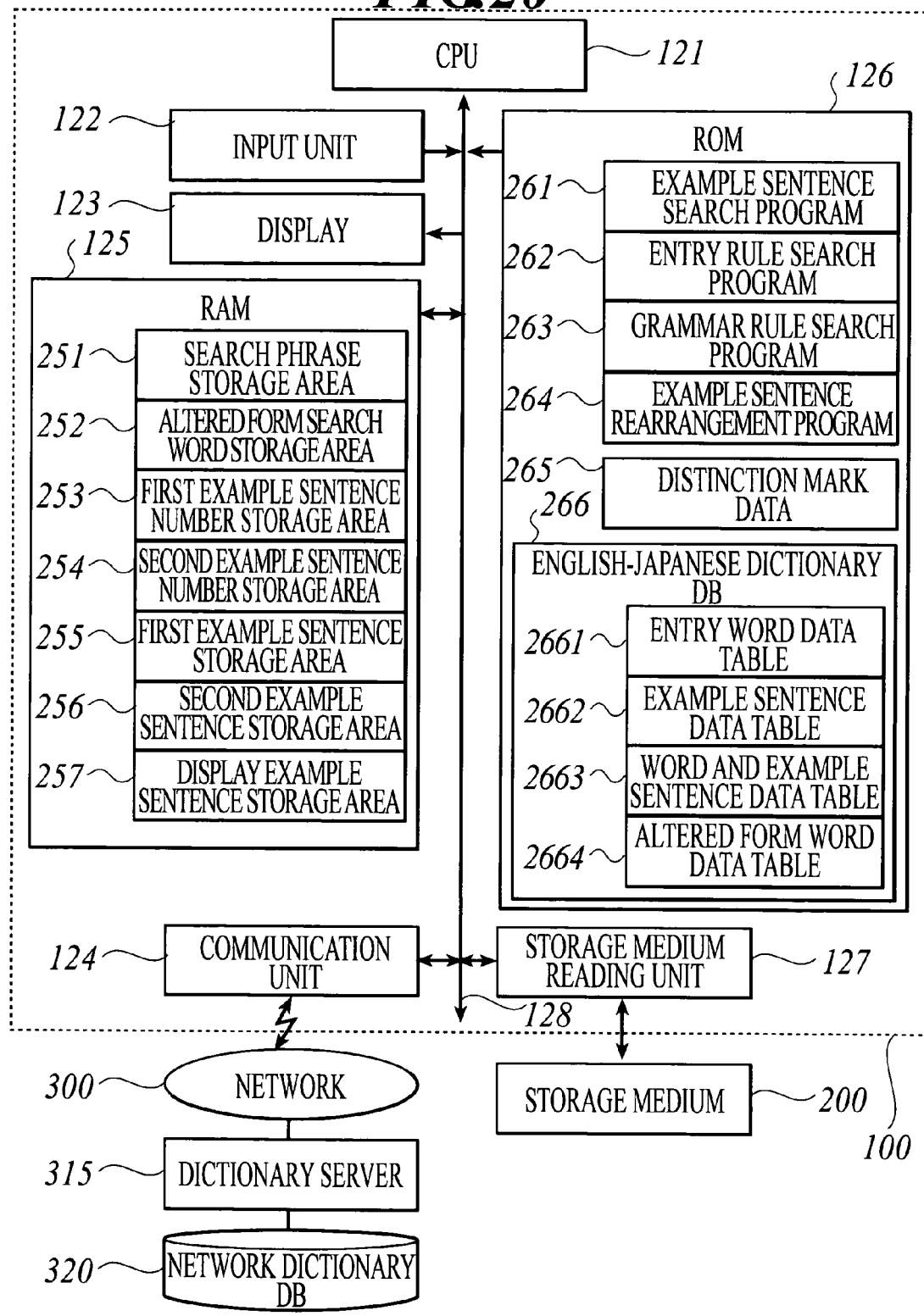
FIG. 20 is a block diagram showing a structure of the portable electronic dictionary.

FIG. 20 is a block diagram showing a structure of the portable electronic dictionary 100. As shown in FIG. 20, the portable electronic dictionary 100 comprises a CPU 121, an input unit 122, a display 123, a communication unit 124, a RAM 125, a ROM 126 and a storage medium reading unit 127. Each of the units is connected through a bus 128.

The CPU 121 executes processes based on predetermined programs according to input instructions, and performs the instruction to each function unit, the transmission of data, and the like to control the portable electronic dictionary 100 integrally. To put it concretely, the CPU 121 loads a program stored in the ROM 126 according to a push signal or the like input at the input unit 122, and executes a process in accordance with the loaded program. Then, the CPU 121 stores a result of the process in the RAM 125, and outputs a display signal for displaying the result of the process to the display 123 suitably. Thereby, the CPU 121 makes the display 123 display the corresponding display information.

Moreover, the CPU 121 loads an example sentence search program 261, which will be described later, to execute an example sentence search process. Thereby, the CPU 121 executes an example sentence search. To put it concretely, the CPU 121 makes the display 123 display an input screen for inputting a search phrase. Then, when the user inputs a search phrase composed of a plurality of words, the CPU 121 searches an English-Japanese dictionary DB 266 for the example sentences including the search phrase, and makes the display 123 display the searched example sentences.

The input unit 122 is an input device comprising a key group necessary for inputting letters such as kanas, alphabets and the like, for selecting functions, or the like. The input unit 122 outputs the push signal of a pushed key, or the like to the CPU 121. With a key input at the input unit 122, especially an input means such as an input of a search phrase, a selection of a kind of the dictionaries, a search execution instruction, a mode change instruction and the like is achieved. Incidentally, the input unit 122 corresponds to the various key group 112 shown in FIG. 19.

The display 123 displays various screens on the basis of display signals input from the CPU 121. Incidentally, the display 123 corresponds to the display screen 111 shown in FIG. 19.

The communication unit 124 is composed of a communication device for transmitting and receiving predetermined information with other devices (for example, a dictionary server 315) connected through a network 300. Applied to the network 300 is a network such as a local area network (LAN), a wide area network (WAN), the Internet or the like. The CPU 121 performs a control for performing communication with an external equipment through the communication unit 124 and a communication line such as a telephone line, an integrated service digital network (ISDN) line, a radio communication channel, a leased line, a cable television (CATV) line or the like.

Incidentally, a structure in which the communication unit 124 is directly connected to the external equipment by means of a wired system or a radio communication system without using the network 300 may be used.

The dictionary server 315 makes dictionary data stored in a network dictionary DB 320 managed by the dictionary server 315 available so as to be searched and displayed. To put it concretely, the dictionary server 315 searches in the network dictionary DB 320 for assigned entry word data according to a search request of dictionary data transmitted from the portable electronic dictionary 100, and transmits explanation data corresponding to the entry word data to the portable electronic dictionary 100 to make the network dictionary DB 320 available and supplied. The network dictionary DB 320 is updated occasionally, for example, with a new word added, or the like. When the dictionary data is updated, a corresponding updating date is suitably updated.

The RAM 125 comprises a memory area for storing various programs to be executed by the CPU 121, data concerning execution of the programs, and the like temporarily. In the present embodiment, the RAM 125 especially comprises a search phrase storage area 251, an altered form search word storage area 252, a first example sentence number storage area 253, a second example sentence number storage area 254, a first example sentence storage area 255, a second example sentence storage area 256 and a display example sentence storage area 257.

The search phrase storage area 251 stores a plurality of words input at the input unit 122. In the following, each of the plurality of input words is called as a search word, and a group composed of a plurality of collected words is called as a plural search phrase. Moreover, in a case of being simply called as a search phrase, the search phrase indicates a word input by a user for a search. The search phrase includes a phrase composed of one word and a phrase composed of a plurality of words (that is, a plural search phrase). In the altered form search word storage area 252, altered forms of the search words stored in the search phrase storage area 251 are stored.

In the first example sentence number storage area 253 and the second example sentence number storage area 254, example sentence identification information extracted during a process where the CPU 121 executes the example sentence search process, is stored. In the first example sentence storage area 255 and a second example sentence storage area 256, stored are example sentences searched for by the execution of the example sentence search process by the CPU 121. In the display example sentence storage area 257, example sentences to be displayed on the display 123 by the CPU 121 are stored.

The ROM 126 stores programs for achieving various types of functions of the portable electronic dictionary 100. In the present embodiment, the ROM 126 stores the example sentence search program 261, an entry rule search program 262, a grammar rule search program 263, an example sentence rearrangement program 264, a distinction mark data 265 and an English-Japanese dictionary DB 266.

The example sentence search program 261 is a program for searching in the English-Japanese dictionary DB 266 for an example sentence including the search phrase input by the user, and for making the CPU 121 execute the example sentence search process for making the display 123 display the searched example sentences.

The entry rule search program 262 is a subroutine program included in the example sentence search program 261. The entry rule search program 262 is a program for making the CPU 121 execute an entry rule search process for replacing the example sentence in accordance with a predetermined mark to re-judge whether the search phrase is included or not when the predetermined mark is included in the searched example sentence.

The grammar rule search program 263 is a subroutine program included in the example sentence search program 261. The grammar rule search program 263 is a program for making the CPU 121 execute a grammar rule search process for acquiring an altered form of a search phrase, and for searching in the English-Japanese dictionary DB 266 for an example sentence including the altered form.

The example sentence rearrangement program 264 is a subroutine program included in the example sentence search program 261. The example sentence rearrangement program 264 is a program for making the CPU 121 execute an example sentence rearrangement process for rearranging the searched example sentences to store them in the display example sentence storage area 257.

The distinction mark data 265 stores images (marks) showing a degree of conformance of the search phrase with the example sentences displayed by the execution of the example sentence search process. To put it concretely, for example, image data such as "◎", "○", "Δ" and the like is stored. When the input search phrase is included in an example sentence as it is, the CPU 121 makes the display 123 display the image data "◎" at the beginning of the example sentence. Moreover, when the search phrase transformed into an altered form is included in the example sentence, the CPU 121 makes the display 123 display the image data "○" at the beginning of the example sentence. When the input search phrase is included in the example sentence in random order, the CPU 121 makes the display 123 display the image data "Δ" at the beginning of the example sentence.

The English-Japanese dictionary DB 266 includes an entry word data table 2661, an example sentence data table 2662, a word and example sentence data table 2663 and an altered form data table 2664. FIG. 21 is a diagram showing an example of a data structure of the entry word data table 2661. In the entry word data table 2661, entry words (for example "English"), explanation data showing a meaning of the entry words (for example, "形)イングランドの, イングランド人の, ..."), and example sentence identification information for assigning example sentences included in the explanation data are stored as related to each other.

The example sentence identification information is information for identifying example sentences stored in the example sentence data table 2662, which will be described later. The example sentence identification information is indicated with example sentence numbers or addresses. Both the example sentence numbers and the addresses are synonymous example sentence identification information for indicating the same example sentences. Any one group of the example sentence numbers and the addresses may be stored as the example sentence identification information. Hereinafter, its description will be made with the example sentence numbers used as the example sentence identification information.

For example, when explanation data "形)イングランドの, イングランド人の, ..." of am entry word "English" is displayed on the display 123 by the CPU 121, example sentences in accordance with the contents of the explanation data are also displayed at the same time. The CPU 121 loads example sentence identification information (the example sentence numbers "00566, ...") corresponding to the entry word "English" and loads example sentences corresponding to the example sentence identification information from the example sentence data table 2662, to make the display 123 display the loaded example sentences along with the explanation data.

FIG. 22 is a diagram showing an example of a data structure of the example sentence data table 2662. The example sentence data table 2662 stores example sentence identification information and example sentences related to the example sentence identification information. Moreover, meanings of the example sentences are also stored.

FIG. 23 is a diagram showing an example of a data structure of the word and example sentence data table 2663. The word and example sentence data table 2663 stores words and example sentence numbers of all the example sentences including the words as related to each other.

Figure 24:
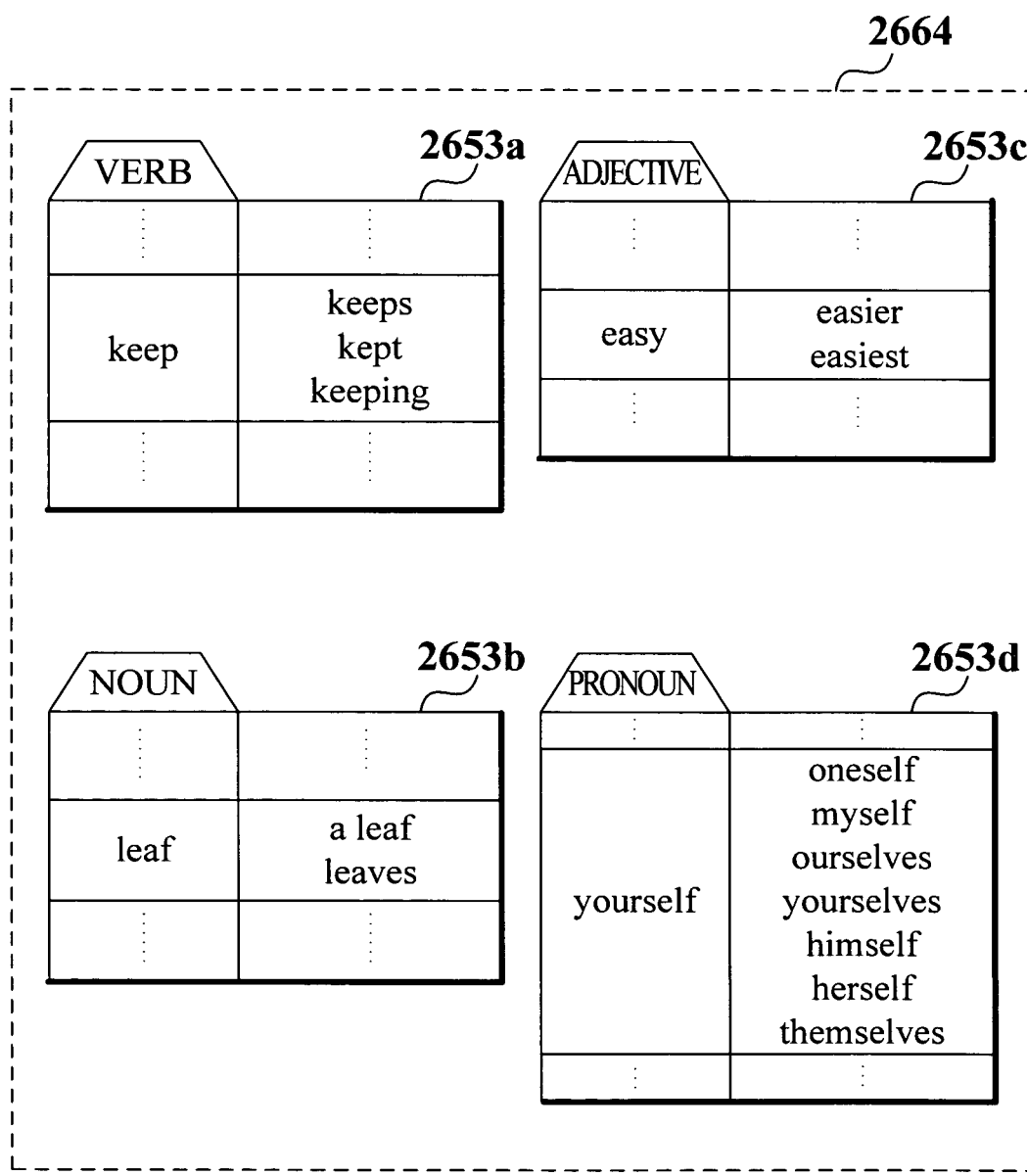
FIG. 24 is a diagram showing a data structure example of an altered form word data table.

FIG. 24 is a diagram showing an example of a data structure of the altered form data table 2664. The altered form data table 2664 stores altered forms from root-form words classified by a part of speech. For example, the altered forms from words of verbs are stored in the folder 2653a. To put it concretely, forms made by adding the third person singular "s" to root forms of verbs, past tense forms, past participle forms, present progressive forms and the like are stored. In a case of a verb "keep", all the altered forms of the verb "keep" such as "keeps, kept, keeping" and the like are stored.

Moreover, altered forms (such as forms made by adding singular "a" or "an" to root forms, plural forms and the like) of words of nouns are respectively stored in a folder 2653b. Altered forms (comparatives, superlatives and the like) of words of adjectives are respectively stored in a folder 2635c.

Forms made by declining words of pronouns into corresponding other forms are respectively stored in a folder 2653d. For example, in a case of a pronoun "I", declined forms "you, we, he, she, they" and the like are stored as related thereto. In a case of a pronoun "yourself", declined forms "oneself, myself, yourselves, ourselves, himself, herself, themselves" and the like are stored as related thereto.

The storage medium reading unit 127 is a function unit for performing the reading and the writing of data onto the storage medium 200 such as a memory card, a hard disk or the like. Incidentally, the storage medium reading unit 127 corresponds to the slot 113 shown in FIG. 19.

The CPU 121 is capable of searching in any one of the dictionary DB's stored in the ROM 126 (the English-Japanese dictionary DB 266 in the present embodiment), various types of dictionary DBs stored in the storage medium 200, and the network dictionary DB 320 for an example sentence including a search phrase. In this case, the dictionary DB stored in the storage medium 200, and the network dictionary DB 320 have the data structure similar to that of the English-Japanese dictionary DB 266. Incidentally, in the present embodiment, the case where the English-Japanese dictionary DB 266 is used for a search for an example sentence will be described.

Figure 25:
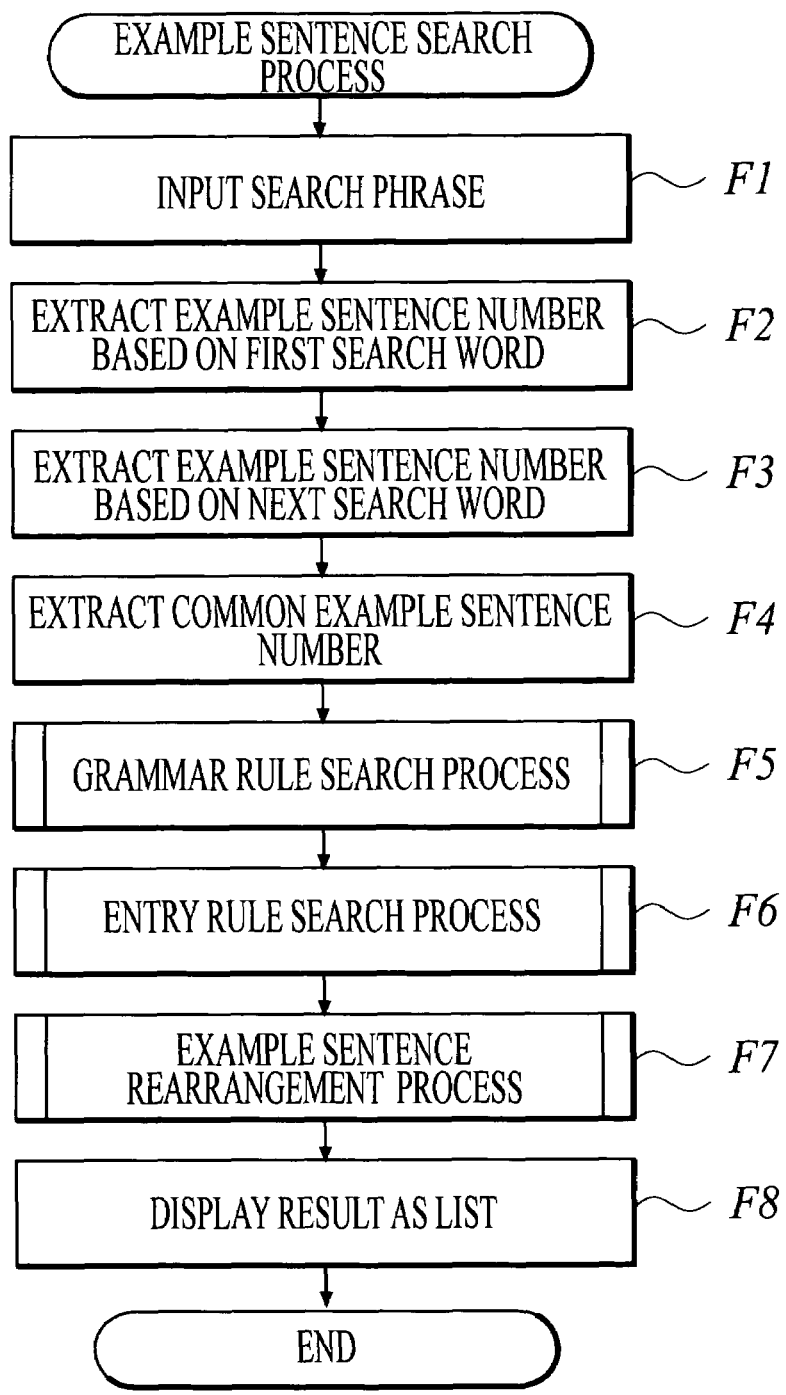
FIG. 25 is a diagram showing an operation flow of the portable electronic dictionary regarding the execution of the example sentence search process.

FIG. 25 is a flowchart for describing operation of the example sentence search process executed by the CPU 121 in accordance with the example sentence search program 261. With reference to FIG. 25, the flow of the example sentence search process will be described.

Figure 29:
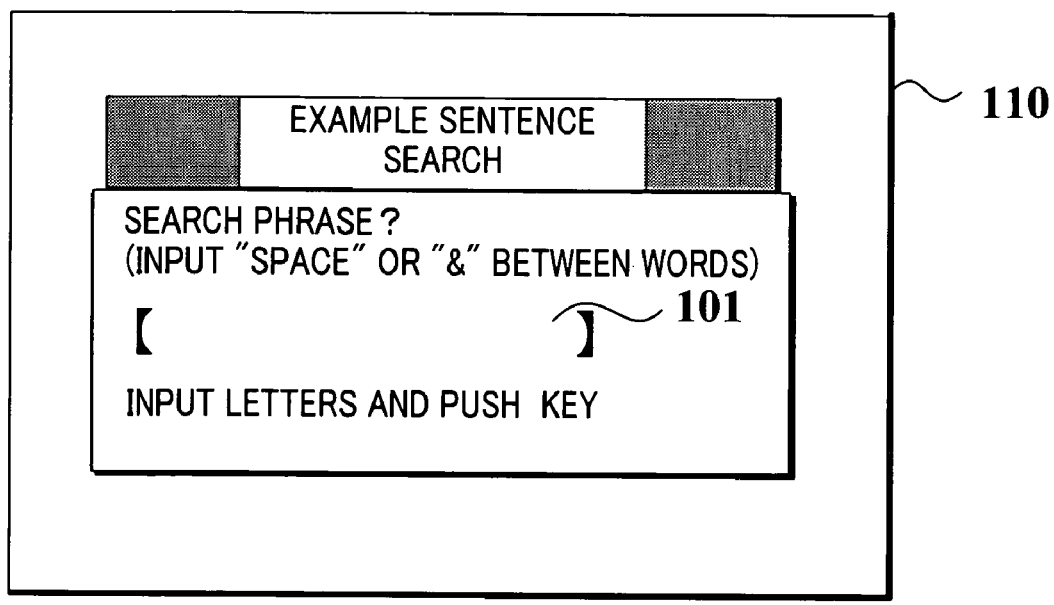
FIG. 29 is a view showing an input screen for inputting a search word.

First, the CPU 121 makes the display 123 display thereon an input screen 110 for inputting a search phrase as shown in FIG. 29. When a user inputs a search phrase (Step F1), the CPU 121 makes the display 123 display letters in an input letter display area 101 on the basis of a push signal of a pushed key, and stores the input search phrase in the search phrase storage area 251.

Now, when the user intends to search for, for example, an example sentence including a collocation or an idiomatic phrase using words of "adult" and "accordingly" continuously, the user inputs the words with a space between the words "adult" and "accordingly". On the other hand, when the user intends to search for an example sentence including the words "adult" and "accordingly" at some positions thereof in random order, the user inputs the words along with a mark "&" between the words "adult" and "accordingly". Incidentally, the space and the mark "&" may be replaced with other predetermined marks. Moreover, regardless of the way of inputting the words "adult" and "accordingly", such as "adult accordingly", "adult & accordingly" or the like, the two words are stored in the order of the input such as "adult, accordingly" in the search phrase storage area 251.

Then, the CPU 121 extracts the example sentence numbers corresponding to the first search word of the input search phrase from the word and example sentence data table 2663 (Step F2). For example, when the search phrase is input as "adult accordingly" in Step F1, the example sentence numbers (00197, ... ) including the word "adult" are extracted from the word and example sentence data table 2663 in Step F2.

Next, the CPU 121 extracts the example sentence numbers corresponding to the next search word of the input search phrase from the word and example sentence data table 2663 (Step F3). For example, when the search phrase "adult accordingly" is input in Step F1 as well as the above, the example sentence numbers (00197, ... ) including "accordingly" is extracted from the word and example sentence data table 2663 in Step F3.

Then, the CPU 121 extracts example sentence numbers common among the example sentence numbers extracted in Steps F2 and F3, and stores the extracted common example sentence numbers in the first example sentence number storage area 253 (Step F4). When "adult accordingly" is input in Step F1 as well as the above, the example sentence number "00197" is extracted in both of Step F2 and Step F3. That is, the common example sentence number is "00197". Consequently, the example sentence number "00197" is stored in the first example sentence number storage area 253 in Step F4.

Incidentally, in the present embodiment, the case where a plural search phrase composed of two search words is input in Step F1 is described, but a plural search phrase composed of two or more search words may be input. In that case, the CPU 121 extracts example sentence numbers of example sentences including each of the search words, and at the end, the CPU 121 extracts common example sentence numbers.

Figure 26:
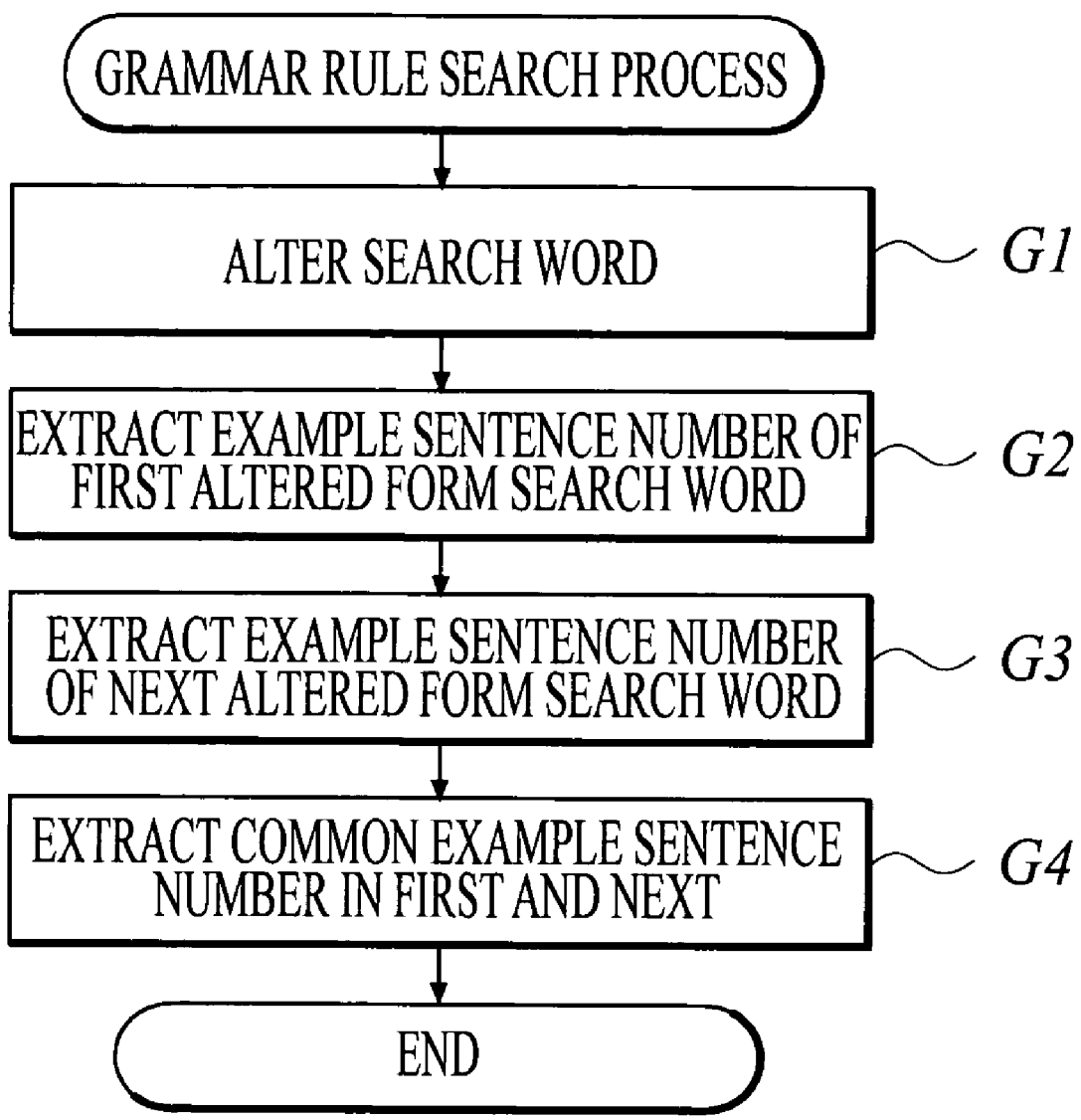
FIG. 26 is a diagram showing an operation flow of the portable electronic dictionary regarding the execution of a grammar rule search process.

Next, the CPU 121 makes a process proceeds to the grammar rule search process (Step F5). FIG. 26 is a flowchart for describing operation of the grammar rule search process executed by the CPU 121 in accordance with the rule search program 263. First, the CPU 121 loads altered forms of the search words stored in the search phrase storage area 251 from the altered form data table 2664, and stores the loaded altered forms in the altered form search word storage area 252 (Step G1).

For example, when "adult, accordingly" is stored in the search phrase storage area 251, a plural form "adults" of the word "adult" is stored in the altered form data table 2664. Consequently, the altered form "adults" is stored in the altered form search word storage area 252. Moreover, the word "accordingly" is an adverb, and the word "accordingly" does not have any altered form. Consequently, in the altered form search word storage area 252, the words "adults, accordingly" are stored.

Then, the CPU 121 extracts example sentence numbers corresponding to the first search word stored in the altered form search word storage area 252 from the word and example sentence data table 2663 (Step G2). For example, when "adults, accordingly" is stored in the altered form search word storage area 252 in Step G1, example sentence numbers of the word "adults" are extracted from the word and example sentence data table 2663 in Step G2. Since no item of the word "adults" exists in the word and example sentence data table 2663 shown in FIG. 23, no example sentence number is extracted.

Next, the CPU 121 extracts example sentence numbers corresponding to the next search word stored in the altered form search word storage area 252 from the word and example sentence data table 2663 (Step G3). For example, when "adults accordingly" is stored in the altered form search word storage area 252 in Step G1 as well as the above, example sentence numbers of example sentences including the word "accordingly" are extracted from the word and example sentence data table 2663 in Step G3. To put it concretely, since example sentence numbers of example sentences including the word "accordingly" in the word and example sentence data table 2663 shown in FIG. 23 are "00197, ... ", the example sentence numbers are extracted by the CPU 121.

Then, the CPU 121 extracts example sentence numbers common among the example sentence numbers extracted in Steps G2 and G3, and stores the example sentences corresponding to the common example sentence numbers in the second example sentence number storage area 254 (Step G4). When "adults, accordingly" is stored in the altered form search word storage area 252 in Step G1 as well as the above, there is no common example sentence number among the example sentence numbers extracted in Steps G2 and G3. In this case, no example sentence number is stored in the second example sentence number storage area 254. Then, the CPU 121 makes the process proceed to Step F6 in the example sentence search process.

Incidentally, the CPU 121 loads altered forms of the search words stored in the search phrase storage area 251 from the altered form data table 2664 to transform the search words in Step G1. However, when there is a plurality of qualified altered forms, the CPU 121 determines search phrases for every different combination. Then, the CPU 121 repeats the process of Steps G2 to G4 on every different altered form combination.

Figure 27:
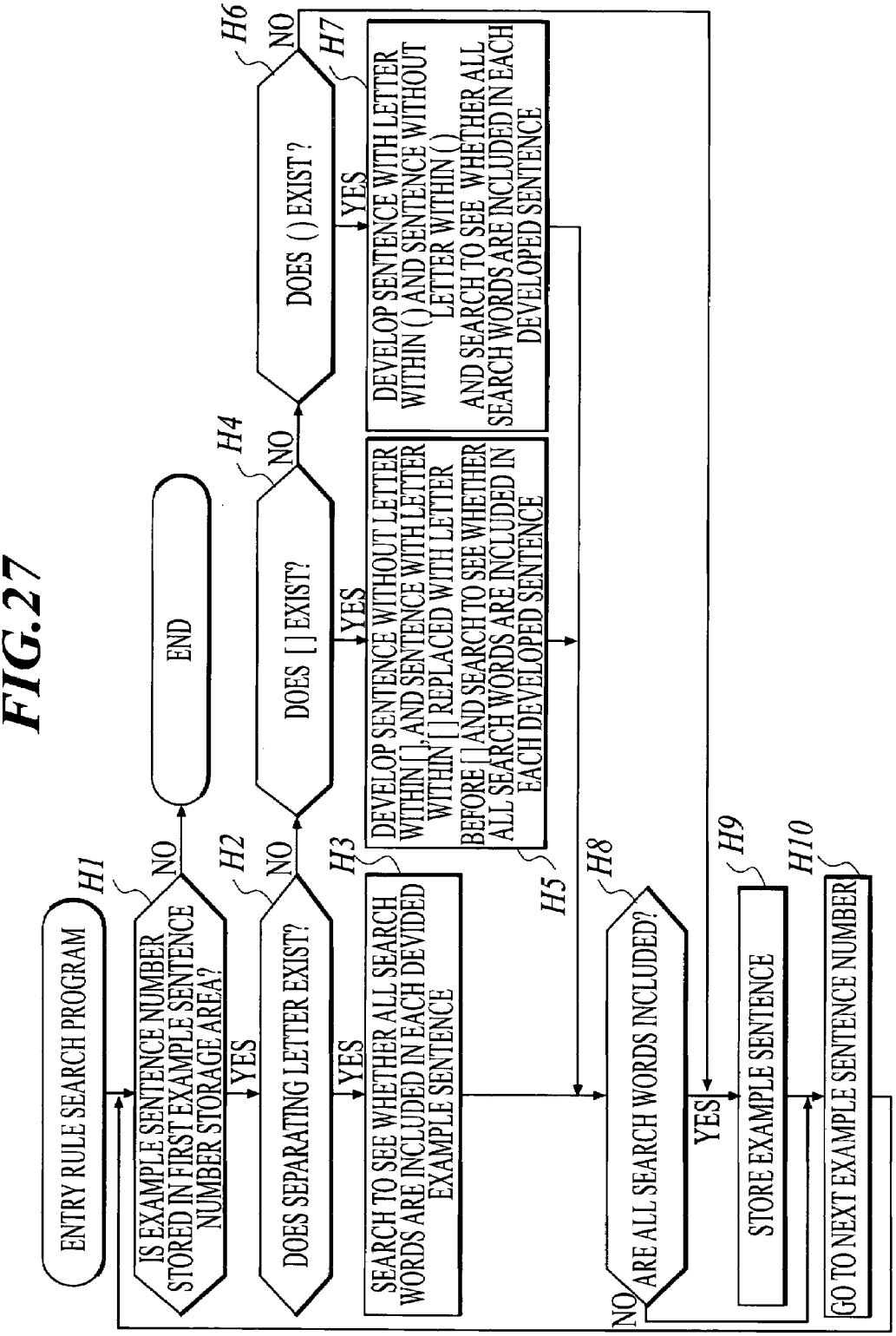
FIG. 27 is a diagram showing an operation flow of the portable electronic dictionary regarding the execution of an entry rule search process.

Successively, the CPU 121 makes the process proceed to the entry rule search process (Step F6). FIG. 27 is a flowchart for describing operation of the entry rule search process to be executed by the CPU 121 in accordance with the entry rule search program 262.

First, the CPU 121 judges whether any example sentence number is stored in the first example sentence number storage area 253 or not (Step H1). If no example sentence number is stored (Step H1; No), the CPU 121 ends the entry rule search process to make the process proceed to Step F7 of the example sentence search process.

If some example sentence numbers are stored (Step H1; Yes), the CPU 121 loads an example sentence and translation corresponding to the example sentence number stored at the beginning from the example sentence data table 2662, and judges whether any separating letter (separating data) is included in the loaded example sentence or not (Step H2).

The separating letter is a letter such as ", (comma)", "=(equal mark)", ". (period)" and the like. A comma in an example sentence indicates a discontinuing part of a meaning or the like. Moreover, an equal mark in an example sentence indicates that the sentences put before and after the equal mark have substantially the same meaning. A period indicates the end of a sentence. Accordingly, when a separating letter is inserted into an example sentence, there are many cases where sentences before and after the inserted separating letter can respectively be used independently.

When a separating letter is included in the loaded example sentence (Step H2; Yes), the CPU 121 divides the example sentence at the separating letter as a boundary, and searches for the search phrase from each of the divided example sentences (Step H3).

On the other hand, when it is judged that no separating letter exists in the loaded example sentence in Step H2 (Step H2; No), the CPU 121 judges whether the example sentence includes "[ ] (brackets or square brackets)" or not (Step H4).

When brackets are included in the example sentence (Step H4; Yes), the CPU 121 searches for the search word from a sentence formed by deleting the words within the brackets from the example sentence and a sentence formed by replacing the word just before the first bracket with the words in the brackets (Step H5).

On the other hand, when it is judged that no bracket is included in the loaded example sentence in Step H4 (Step H4; No), the CPU 121 judges whether "( ) (parentheses or round bracket)" are included in the example sentence or not (Step H6).

When the parentheses are included in the example sentence (Step H6; Yes), the CPU 121 searches for the search phrase from a sentence formed by deleting the words in the parentheses from the example sentence and a sentence including the words in the parentheses (Step H7). Moreover, when it is judged that no parenthesis is included in the loaded example sentence in Step H6 (Step H6; No), the CPU 121 makes the process proceeds to a Step H9.

Then, the CPU 121 judges whether there is any sentence including the entire search phrase in the plurality of sentences developed in accordance with the various separating letters in Step H3, Step H5 or Step H7 (Step H8). When it is judged that no sentence including the entire search phrase exists (Step H8; No), the CPU 121 makes the process proceed to a Step H10.

When it is judged that some sentences including the entire search phrase exist (Step H8; Yes), the CPU 121 stores the sentences including all the search words and the translation among the plurality of sentences developed in accordance with the various separating letters to the first example sentence storage area 255 (Step H9).

Successively, the CPU 121 assigns the next example sentence number stored in the first example sentence number storage area 253 (Step H10), and makes the process proceed to Step H1. Moreover, if the process of Steps H1 to H10 on all the example sentence numbers in the first example sentence number storage area 253 has been completed, the CPU 121 repeats the process of Steps H1 to H10 on the example sentence numbers stored in the second example sentence number storage area 254 as well. At this time, the CPU 121 performs the search based on the search phrase transformed into altered forms in Steps H3, H5 and H7. Then, the CPU 121 stores the searched example sentences in the second example sentence storage area 256 in Step H9.

Figure 30A:
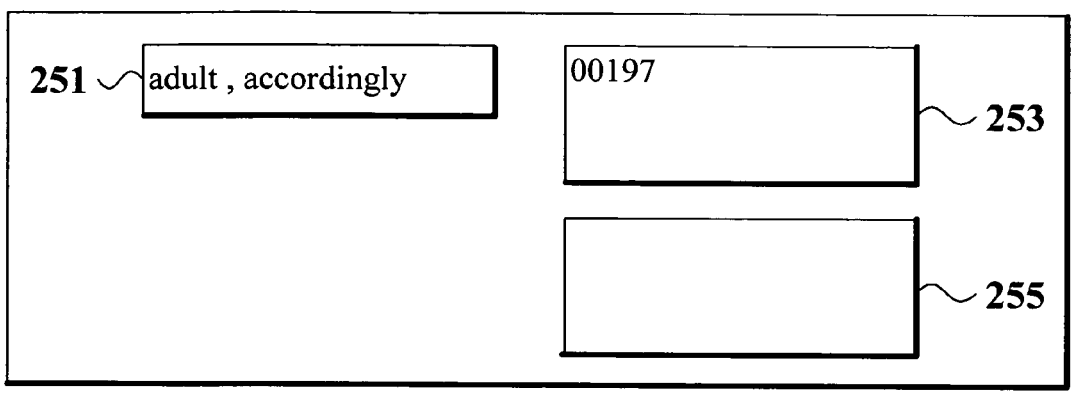
FIGS. 30A, 30B and 30C are views showing examples of storing contents in a search word storage area, a first example sentence number storage area and a first example sentence storage area.
Figure 30B:
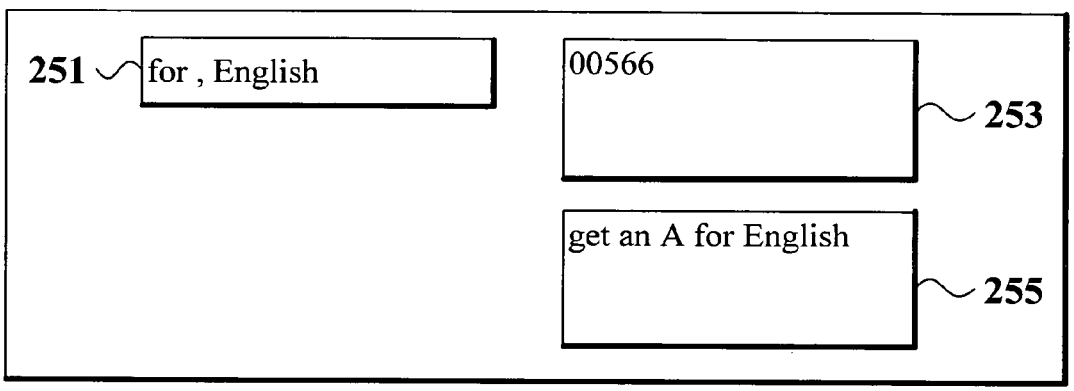
Figure 30C:
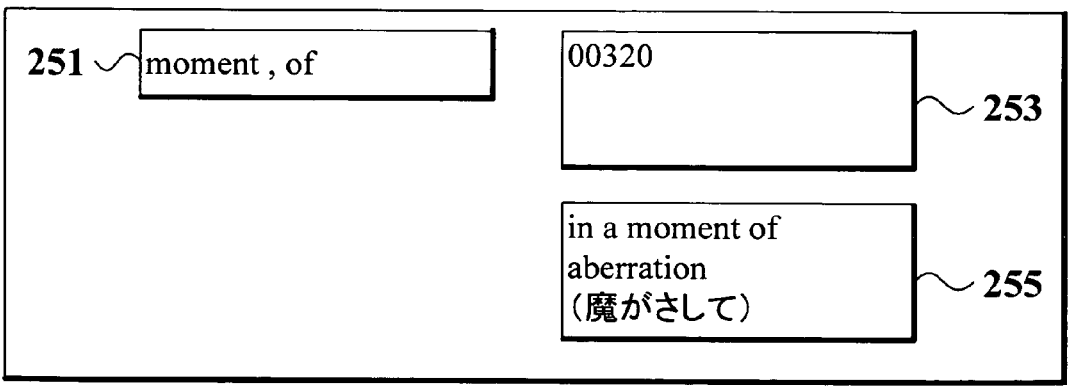

FIG. 30A to 30C are diagrams showing examples of storage contents in the search phrase storage area 251, the first example sentence number storage area 253 and the first example sentence storage area 255. With reference to FIGS. 30A to 30C, a flow of a concrete process of the entry rule search process will be described.

FIG. 30A is a diagram showing examples of storage contents in each storage area in the case where a search phrase "adult accordingly" is input in Step F1 of the example sentence search process. In this case, an example sentence number "00197" of an example sentence including the words "adult" and "accordingly" is stored in the first example sentence number storage area 253 in Step F4. Then, in Step H2, an example sentence "She is an adult, so you should treat her accordingly." and translation thereof corresponding to the example sentence number "00197" are loaded from the example sentence data table 2662.

Successively, whether any separating letter is included in the loaded example sentence or not is judged. Since a comma is included in the loaded example sentence, the example sentence is divided into a clause "She is an adult" and a clause "so you should treat her accordingly" in Step H3. Then, whether each of the clauses includes the words "adult" and "accordingly" or not is searched.

However, neither of the clauses "She is an adult" nor "so you should treat her accordingly" does not include both the words "adult" and "accordingly". Consequently, no example sentence is stored in the first example sentence storage area 255.

FIG. 30B is a diagram showing examples of storage contents in each storage area in the case where a phrase "for English" is input in Step F1 of the example sentence search process. In this case, an example sentence number "00566" of an example sentence including the words "for" and "English" is stored in the first example sentence number storage area 253 in Step F4. Then, in Step H2, the example sentence "get an A in [for] English" and the translation thereof corresponding to the example sentence number "00566" is loaded from the example sentence data table 2662.

Since no separating letter is included in the loaded example sentence, it is judged whether any brackets are included therein or not in Step H4. Since brackets are included in the loaded example sentence, two phrases of "get an A in English" and "get an A for English" are generated from the example sentence in Step H5. Then, words "for" and "English" are searched for in each of the phrases.

Hereupon, although the phrase "get an A in English" does not include both the words "for" and "English", the phrase "get an A for English" includes both the words "for" and "English". Consequently, the phrase "get an A for English" and the translation thereof are stored in the first example sentence storage area 255 in Step H9.

FIG. 30C is a diagram showing an example of storage content of each storage area in the case where a phrase "moment of" is input in Step F1 of the example sentence search process. In this case, in Step F4, an example sentence number "00320" of an example sentence including the words "moment" and "of" is stored in the first example sentence number storage area 253. Then, in Step H2, the example sentence "in (a moment of) aberration" and the translation thereof corresponding to the example sentence number "00320" are loaded from the example sentence data table 2662.

Since no separating letter and bracket is included in the loaded example sentence, it is judged whether any parentheses are included in the example sentence or not in Step H6. Since the loaded example sentence includes parentheses, two phrases "in aberration" and "in a moment of aberration" having the same meaning are generated from the example sentence in Step H7, and the words "moment" and "of" are searched for in each of the sentences.

Hereupon, although the phrase "in aberration" does not includes both the words "moment" and "of", the phrase "in a moment of aberration" includes both the words "moment" and "of". Consequently, in Step H9, the phrase "in a moment of aberration" and the translation thereof are stored in the first example sentence storage area 255.

Figure 28:
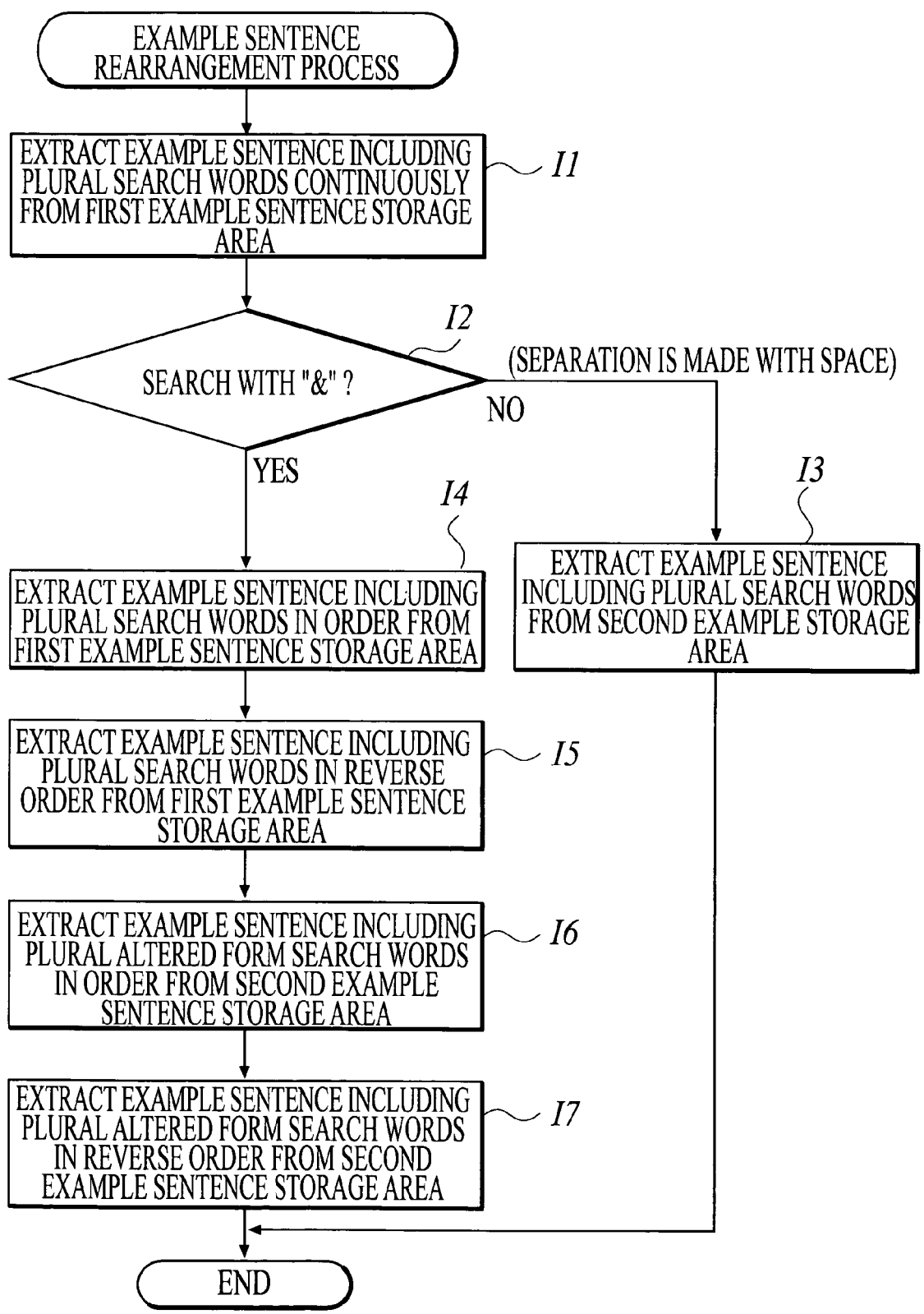
FIG. 28 is a diagram showing an operation flow of the portable electronic dictionary regarding the execution of an example sentence rearrangement process.

Successively, the CPU 121 makes the process proceed to the example sentence rearrangement process (Step F7). FIG. 28 is a flowchart for describing operation of the example sentence rearrangement process executed by the CPU 121 in accordance with the example sentence rearrangement program 264.

First, the CPU 121 extracts an example sentence and its translation including a search phrase continuously form the first example sentence storage area 255 to store the extracted example sentence and translation in the display example sentence storage area 257 (Step I1). Moreover, at the same time, the CPU 121 stores the image data "◎" stored in the distinction mark data 265 as related to the extracted example sentences. Thereafter, example sentences will be stored in the order of being stored in the display example sentence storage area 257.

Next, the CPU 121 judges whether a mark "&" is input between the search words when the search phrase is input (Step I2). That is, the CPU 121 judges whether the search phrase is input, for example, as "in school" with a space between the search words or whether the search phrase is input, for example, as "in&school" with the mark "&" between the search words in Step F1 of the example sentence search process.

When it is judged that the mark "&" is not input (Step I2; No), the CPU 121 extracts an example sentence and its translation including the search phrase transformed into its altered form continuously from the second example sentence storage area 256, and stores the extracted example sentence and the translation in the display example sentence storage area 257 (Step I3). At the same time, the CPU 121 stores the mark "○" stored in the distinction mark data 265 as related to the extracted example sentence. Then, the CPU 121 ends the example sentence rearrangement process.

On the other hand, when it is judged that the mark "&" is input (Step I2; Yes), the CPU 121 extracts an example sentence and its translation including the search phrase in the order of being stored in the search phrase storage area 251 from the first example sentence storage area 255, and stores the extracted example sentence and the translation in the display example sentence storage area 257 (Step I4). At the same time, the CPU 121 stores the mark "◎" stored in the distinction mark data 265 as related to the extracted example sentence.

Successively, the CPU 121 extracts an example sentence including the search phrase in the reverse order of the order of the search words stored in the search phrase storage area 251, and the translation of the example sentence from the first example sentence storage area 255. Then, the CPU 121 stores the extracted example sentence and the translation in the display example sentence storage area 257 (Step I5). At the same time, the CPU 121 stores the mark "Δ" stored in the distinction mark data 265 as related to the extracted example sentence.

Next, the CPU 121 extracts an example sentence including the search word transformed into its altered forms in the order of being stored in the altered form search word storage area 252, and translation of the search word from the second example sentence storage area 256, and stores the example sentence and the translation in the display example sentence storage area 257 (Step I6). Then, the CPU 121 extracts the example sentence including the search word transformed into its altered form stored in the altered form search word storage area 252 in the reverse order, and the translation of the extracted example sentence from the second example sentence storage area 256, and stores the extracted example sentence and the translation in the display example sentence storage area 257 (Step I7). At the completion of the example sentence rearrangement process, the CPU 121 makes the process proceed to Step F8 of the example sentence search process.

Figure 31:
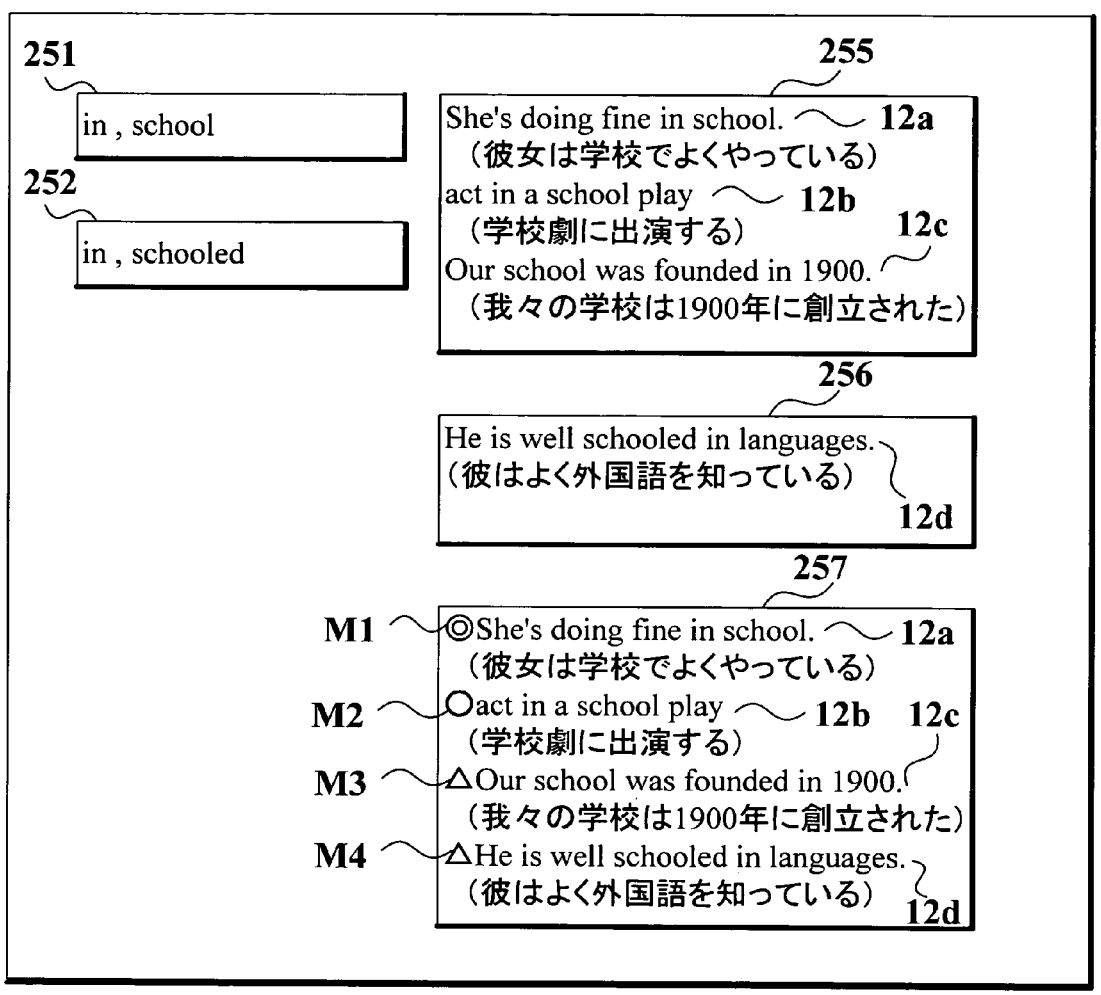
FIG. 31 is a view showing an example of the storing contents in the search word storage area, the altered form word storage area, the first example sentence storage area, the second example sentence storage area and the display example sentence storage area.

Successively, with reference to FIG. 31, a flow of a concrete process of the example sentence rearrangement process will be described. FIG. 31 is a diagram showing an example of storage contents of the search phrase storage area 251, the altered form search word storage area 252, the first example sentence storage area 255, the second example sentence storage area 256 and the display example sentence storage area 257 in the case where a search phrase "in school" or "in&school" is input in Step F1 of the example sentence search process.

In each storage area of FIG. 31, an example sentence 12a, an example sentence 12b, an example sentence 12c and the like are stored in the first example sentence storage area 255 in Step H9 of the entry rule search process. Moreover, "school" is transformed into an altered form, and "in, schooled" is stored in the altered form search word storage area 252. Consequently, an example sentence 12d and the like are stored in the second example sentence storage area 256.

Then, the example sentence 12a including the words "in" and "school" continuously and the mark "◎ (M1)" are stored in the display example sentence storage area 257 in Step I1 of the example sentence rearrangement process. Then, when the search phrase "in school" with a space between the search words is input in Step F1 of the example sentence search process, example sentences including the words "in" and "schooled" continuously are searched for from the second example sentence storage area 256 in Step I3. Since an example sentence including the words "in" and "schooled" continuously is not stored in the second example sentence storage area 256 shown in FIG. 31, no example sentence is loaded and stored additionally in the display example sentence storage area 257.

On the other hand, when a search phrase "in&school" with the mark "&" between the search words is input in Step F1 of the example sentence search process, the example sentence 12b including the two search words in the order of "in" and "school" and the mark "○ (M2)" are stored in the display example sentence storage area 257 in Step I4. In this case, another word may exist between the respective search words "in" and "school". Then, in Step I5, the example sentence 12c including the two search words in the order of "school" and "in" and the mark "Δ (M3)" are stored in the display example sentence storage area 257.

Next, in Step I6, example sentences including two search words in the order of "in" and "schooled" are extracted. Since no example sentence including the two search words in the order of "in" and "schooled" is stored in the second example sentence storage area 256 shown in FIG. 31, no example sentence is loaded and stored additionally in the display example sentence storage area 257. Then, in Step I7, the example sentence 12d including the two search words in the order of "schooled" and "in", and the mark "Δ (M4)" are stored in the display example sentence storage area 257.

Successively, the CPU 121 makes the process proceed to Step F8 of the example sentence search process, and makes the display 123 display thereon the example sentence stored in the display example sentence storage area 257, the translation thereof, and the identification mark thereof. Then, the CPU 121 ends the example sentence search process.

Figure 32A:
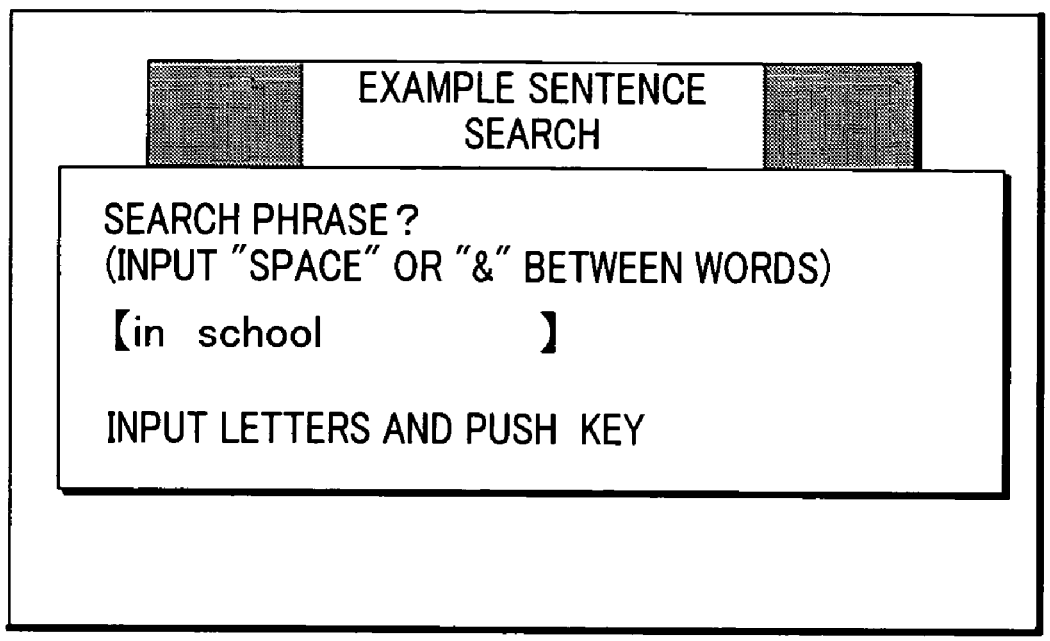
FIGS. 32A and 32B are views showing examples of an input screen displayed on a display and a display screen of a search result.
Figure 32B:
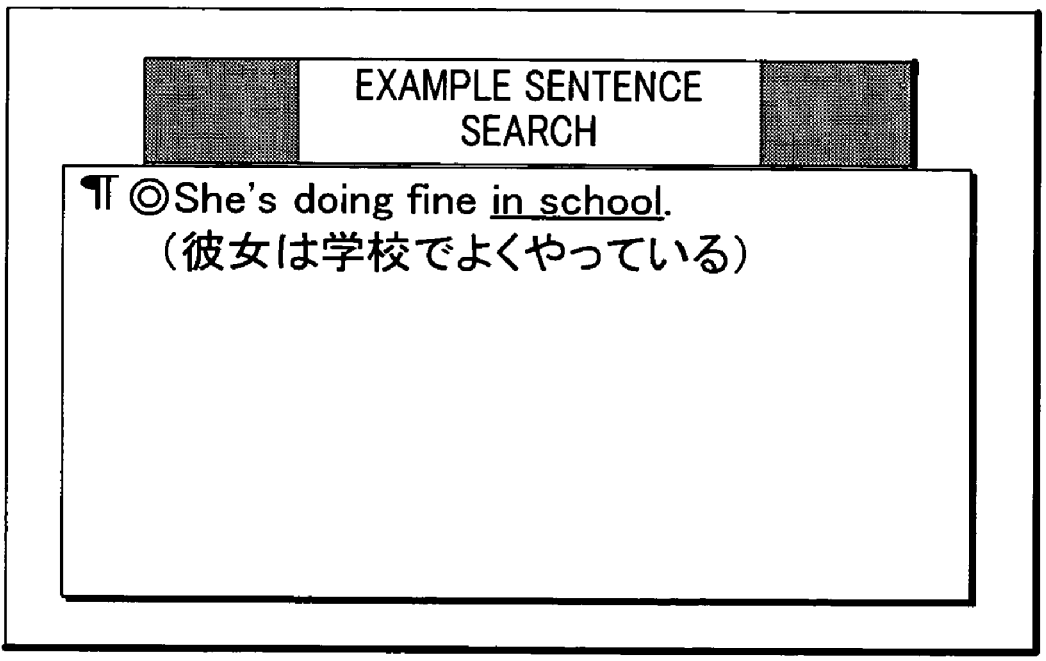
Figure 33A:
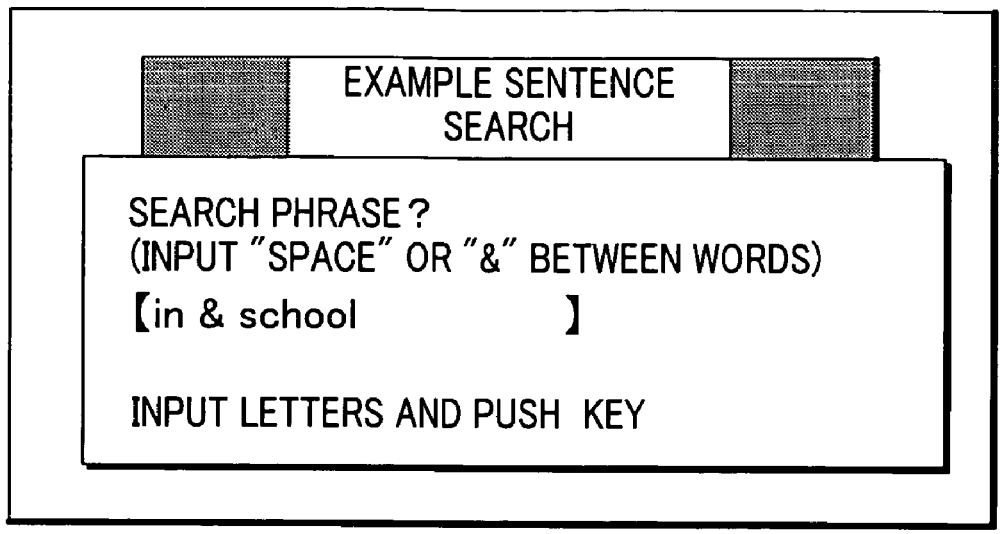
FIGS. 33A and 33B are views showing other examples of the input screen displayed on the display and the display screen of another search result.
Figure 33B:
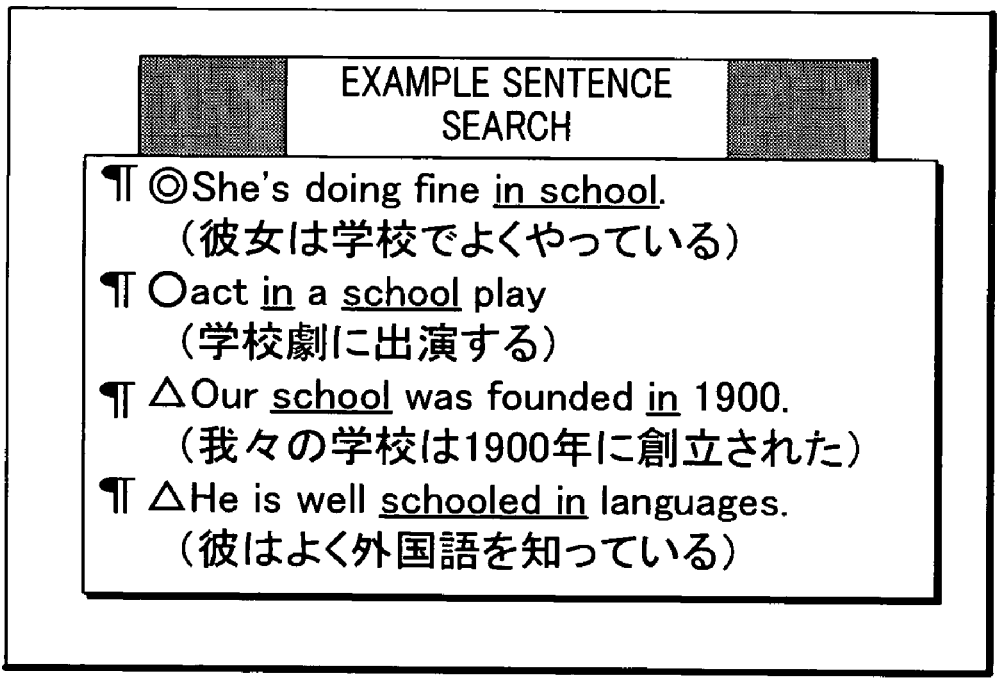

FIG. 32A is an example of an input screen displayed on the display 123 in Step F1 of the example sentence search process. Hereupon, an example of a display screen of a search result at the time when a search phrase "in school" is input is shown in FIG. 32B. Moreover, FIG. 33A is an example of an input screen displayed in Step 33 of the example sentence search process. Hereupon, an example of a display screen of a search result at the time when a search phrase "in&school" is input is shown in FIG. 33B. When the CPU 121 makes the display 123 display thereon the searched example sentences and their translations, the CPU 121 makes the input words as search words display with underlines.

As described above, when an example sentence is searched for in the state of the search words with a space therebetween, only an example sentence including the input search words continuously is searched for. Consequently, an example sentence which conforms to user's intention can be searched for and be displayed. Moreover, an example sentence using altered forms of the search phrase is simultaneously searched for. Consequently, an example sentence using a transformed altered form can be also displayed as search results. Thereby, an example sentence using the search phrase in both of its root form and its altered form can be automatically found.

Moreover, identification marks are displayed in the order of a degree of conformance to the input search phrases along with the example sentences as the search results. Thereby, it becomes easy for a user to recognize an example sentence close to an intended example sentence.

In the above, an embodiment of the present invention has been described, but the present invention is not limited to the embodiment described above. It is needless to say that various types of alterations can be performed without departing from the essence of the present invention.

For example, in the embodiment, a search is preformed by transforming an input search phrase into its altered form, but, for example, the present invention may be constituted so as to be capable of searching for an example sentence of interrogative sentences by declining a personal pronoun or the like and further by rearranging search words.

For example, when a search word includes a personal pronoun, in Step B1 of the grammar rule search process, the CPU 121 performs a process of determining a word declined to another person on the basis of the altered form data table 2664 as a personal pronoun of the search word, and performs a process of rearranging the search words to be an interrogative form. To put it concretely, when a phrase "I would like" is input as a search phrase, a pronoun "I" is declined to another pronoun "you", and the search words are rearranged to a phrase "would you like". Thereby, example sentences including the interrogative form "Would you like—?" can be also searched for in addition to the example sentences including the input search phrases.

Moreover, when searched example sentences and their translations are displayed on the display 123, the words input as the search phrase are displayed with underlines. However, the words may be displayed with their fonts or styles changed, or their color changed.

Moreover, the English-Japanese dictionary DB 266 comprises the altered form data table 2664. But the English-Japanese dictionary DB 266 may store altered forms of each entry word in addition to each entry word in the entry word data table 2661.

What is claimed is:

1. An information display control apparatus, comprising:
   example sentence storage means for correspondingly storing, for a plurality of example sentences, the example sentence and an entry word of the example sentence;
   collocation storage means for correspondingly storing a collocation included in each example sentence stored in the example sentence storage means and a level of the collocation;
   input means for inputting a plurality of words with a predetermined letter separating the words;
   extraction means for extracting the example sentence having the plurality of words in an input order of the plurality of words from among the example sentences stored in the example sentence storage means; and
   collocation level display control means for loading the collocation included in each example sentence extracted by the extraction means, the collocation including the plurality of words input by the input means from among the collocations stored in the collocation storage means, and for performing control of displaying each said extracted example sentence based on the level of the loaded collocation.

2. The information display control apparatus according to claim 1, wherein the display control means comprises collocation level order display control means for controlling an order of each said example sentence to be displayed in accordance with an order of the level of the collocation of each said example sentence.

3. The information display control apparatus according to claim 1, further comprising example sentence identification information storage means for storing, for each word, identification information of the example sentence including the word, wherein the extraction means comprises common example sentence extraction means for loading the identification information of each example sentence including one of the plurality of words input by the input means, and for extracting each example sentence having identification information common to the plurality of words input by the input means.

4. A computer-readable recording medium recording a program that is executable by a computer for causing the computer to perform functions comprising:
   correspondingly storing, for a plurality of example sentences, the example sentence and an entry word of the example sentence;
   correspondingly storing a collocation included in each example sentence stored in the example sentence storage function and a level of the collocation;
   receiving an input of a plurality of words with a predetermined letter separating the words;
   extracting the stored example sentence having the plurality of inputted words in an input order of the inputted words from among the stored example sentences; and
   loading the collocation included in each example sentence extracted by the extraction function, the collocation including the plurality of inputted words from among the stored collocations, and for performing control of displaying each said extracted example sentence based on the level of the loaded collocation.

5. An information display control apparatus, comprising:
   example sentence storage means for storing a plurality of example sentences in accordance with a predetermined dictionary statement rule;
   search phrase input means for inputting a search phrase composed of a plurality of words;
   example sentence extraction means for extracting the example sentence including all of the plurality of words composing the search phrase input by the search phrase input means from among the example sentences stored in the example sentence storage means;
   word transformation means for transforming at least one word input by the search phrase input means in accordance with a predetermined grammar rule;
   determination means for determining words for a grammar rule search by replacing at least one word among the plurality of words input by the search phrase input means with the at least one word transformed by the word transformation means from the at least one word among the plurality of words input by the search phrase input means;
   grammar rule search means for extracting the example sentence including all of the words determined by the determination means from among the example sentences stored in the example sentence storage means;
   development means for developing each example sentence extracted by the example sentence extraction means and the grammar rule search means into a plurality of sentences in accordance with the predetermined dictionary statement rule;

search means for searching among each extracted example sentence for the example sentence including all of the plurality of words input by the search phrase input means corresponding to any one of the plurality of sentences developed by the development means; and an example sentence display means for displaying the example sentence searched for by the search means.

6. The information display control apparatus according to claim 5, wherein the search phrase input means comprises separation input means for inputting the plurality of words with a predetermined letter separating the words; and wherein the search means comprises input order extraction means for extracting, from among each example sentence searched for by the search means, the example sentence including all of the input plurality of words continuously in an input order of the plurality of words corresponding to any one of the plurality of sentences developed by the development means, when the plurality of words are input with the predetermined letter separating the plurality of words.

7. The information display control apparatus according to claim 5, wherein the development means comprises division means for judging whether or not the example sentence includes predetermined separation data, and for developing the example sentence into a plurality of example sentences by dividing the example sentence into a sentence before a position of the predetermined separation data and a sentence after the position of the predetermined separation data if it is judged that the separation data is included.

8. The information display control apparatus according to claim 5, wherein the development means comprises replacement development means for judging whether or not the example sentence includes a predetermined word replacement mark, and for developing the example sentence into a sentence which is the example sentence without a replacement word assigned by the predetermined word replacement mark and a sentence which is the example sentence with the replacement word replaced with the word before the predetermined word replacement mark, if it is judged that the predetermined word replacement mark is included.

9. The information display control apparatus according to claim 5, wherein the development means comprises addition development means for judging whether or not the example sentence includes a predetermined word addition mark, and for developing the example sentence into a sentence which is the example sentence without an addition word assigned by the predetermined word addition mark added and a sentence which is the example sentence with an addition word assigned by the predetermined word addition mark added, if it is judged that the predetermined word addition mark is included.

10. The information display control apparatus according to claim 5, further comprising basic search means for searching for the example sentence including all the plurality of words input by the search phrase input means among the plurality of example sentences stored in the example sentence storage means, wherein the example sentence display means comprises first preference display means for displaying the example sentence searched for by the basic search means in preference to the example sentence searched for by the search means.

11. A computer-readable recording medium recording a program that is executable by a computer for causing the computer to perform functions comprising:

storing a plurality of example sentences in accordance with a predetermined dictionary statement rule;

receiving an input of a search phrase composed of a plurality of words;

extracting the example sentence including all of the plurality of words composing the inputted search phrase from among the stored example sentences;

transforming at least one inputted word in accordance with a predetermined grammar rule;

determining words for a grammar rule search by replacing at least one word among the plurality of inputted words with the at least one word transformed from the at least one word among the plurality of inputted words;

extracting the example sentence including all of the determined words from among the stored example sentences;

developing each extracted example sentence including all of the plurality of words composing the inputted search phrase and each extracted example sentence including all of the determined words into a plurality of sentences in accordance with the predetermined dictionary statement rule;

searching among each extracted sentence for the example sentence including all of the plurality of inputted words corresponding to any one of the plurality of sentences developed by the development function; and displaying the example sentence searched for by the search function.

* * * * *